(12) United States Patent
Kikuchi

(10) Patent No.: US 11,131,837 B2
(45) Date of Patent: Sep. 28, 2021

(54) ZOOM LENS AND IMAGE PICKUP APPARATUS INCLUDING THE SAME

(71) Applicant: CANON KABUSHIKI KAISHA, Tokyo (JP)

(72) Inventor: Shohei Kikuchi, Saitama (JP)

(73) Assignee: CANON KABUSHIKI KAISHA, Tokyo (JP)

(*) Notice: Subject to any disclaimer, the term of this patent is extended or adjusted under 35 U.S.C. 154(b) by 76 days.

(21) Appl. No.: 16/388,727

(22) Filed: Apr. 18, 2019

(65) Prior Publication Data

US 2019/0324229 A1 Oct. 24, 2019

(30) Foreign Application Priority Data

Apr. 23, 2018 (JP) .............................. JP2018-082015

(51) Int. Cl.
*G02B 15/14* (2006.01)
*G02B 13/00* (2006.01)
*G02B 15/163* (2006.01)

(52) U.S. Cl.
CPC ......... *G02B 13/009* (2013.01); *G02B 13/002* (2013.01); *G02B 15/163* (2013.01)

(58) Field of Classification Search
CPC ... G02B 13/009; G02B 13/002; G02B 15/163
USPC ................................................ 359/683, 686
See application file for complete search history.

(56) References Cited

U.S. PATENT DOCUMENTS

| 2014/0307152 | A1 | 10/2014 | Iwamoto | |
|---|---|---|---|---|
| 2016/0341939 | A1* | 11/2016 | Koida | G02B 5/005 |
| 2019/0056572 | A1* | 2/2019 | Takada | G02B 15/20 |

FOREIGN PATENT DOCUMENTS

| CN | 105765435 A | 7/2016 |
|---|---|---|
| JP | 2014-106243 A | 6/2014 |
| JP | 2014-206674 A | 10/2014 |
| JP | 2015-34892 A | 2/2015 |
| JP | 2017-003647 A | 1/2017 |
| JP | 2017-146393 A | 8/2017 |
| WO | 2017/175306 A1 | 10/2017 |

* cited by examiner

*Primary Examiner* — William Choi
(74) *Attorney, Agent, or Firm* — Canon U.S.A., Inc. IP Division

(57) ABSTRACT

Provided is a zoom lens including, in order from an object side to an image side, a first lens unit having a negative refractive power, a second lens unit having a positive refractive power, and a rear lens group including a plurality of lens units. The zoom lens has a configuration in which an interval between each pair of adjacent lens units is changed for zooming. The first lens unit is configured to move for zooming. The rear lens group includes at least one lens unit having a negative refractive power. Further, a focal length of the first lens unit, a focal length of the second lens unit, a focal length of the zoom lens at the wide angle end, a total length of the zoom lens at the wide angle end, and a back focus at the wide angle end are each appropriately set.

12 Claims, 12 Drawing Sheets

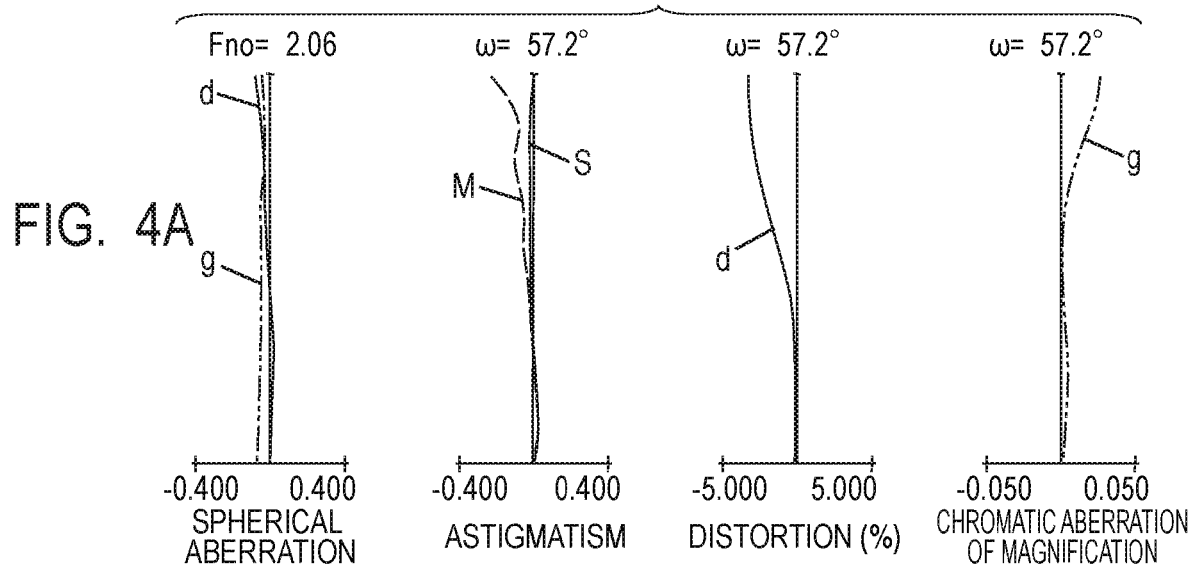
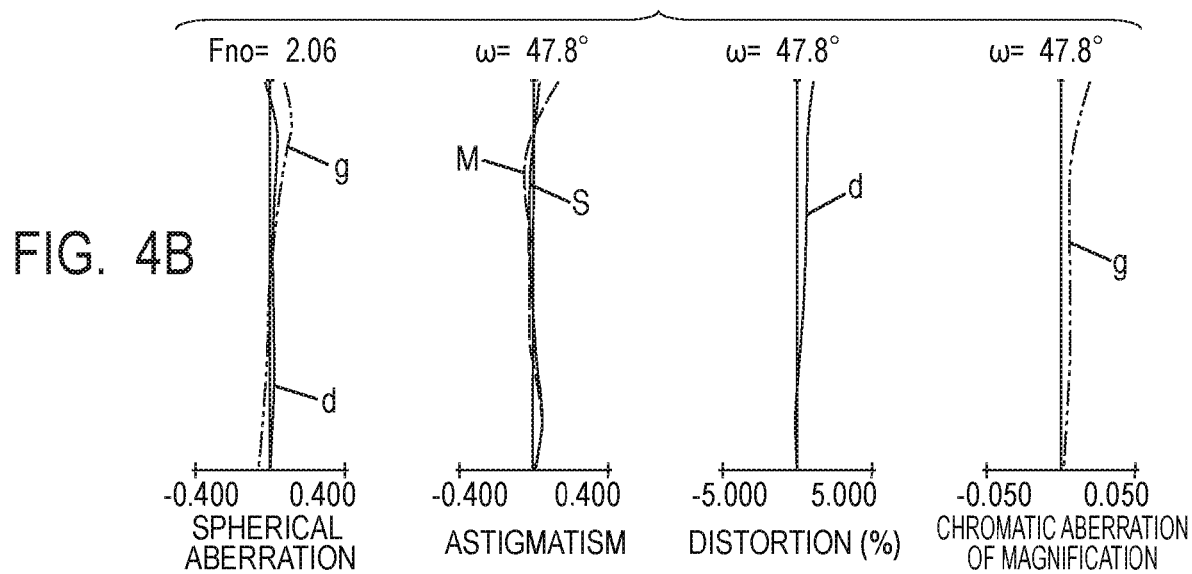
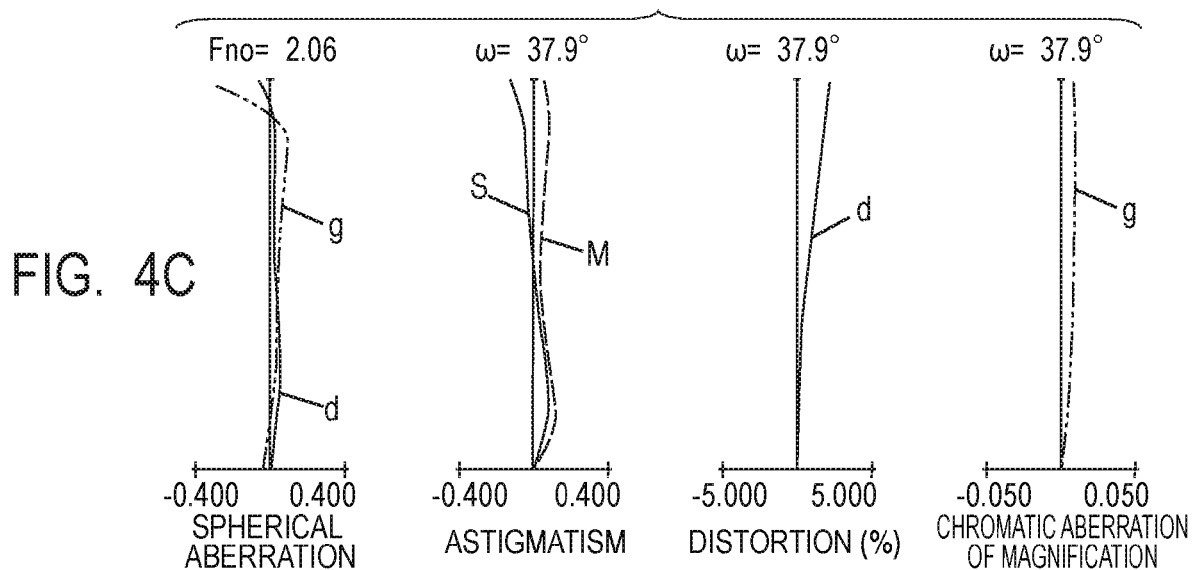

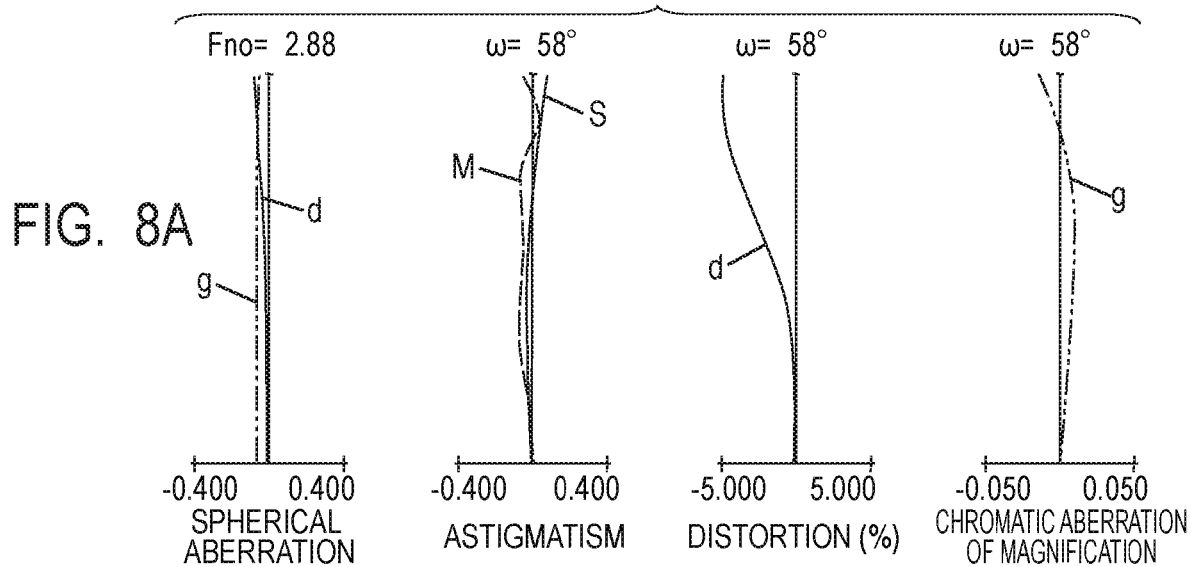
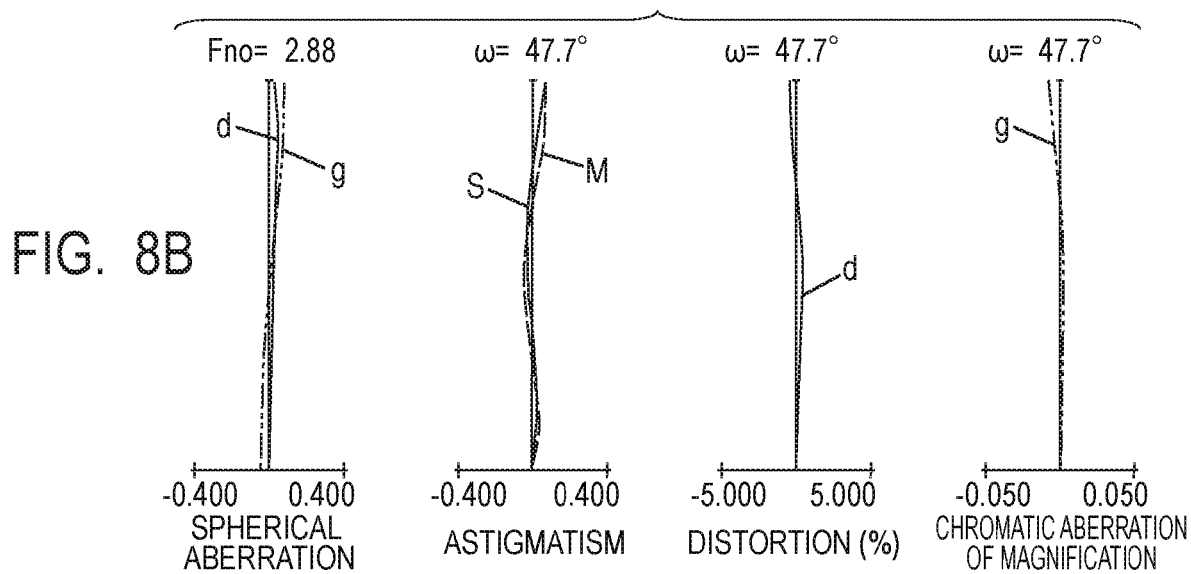
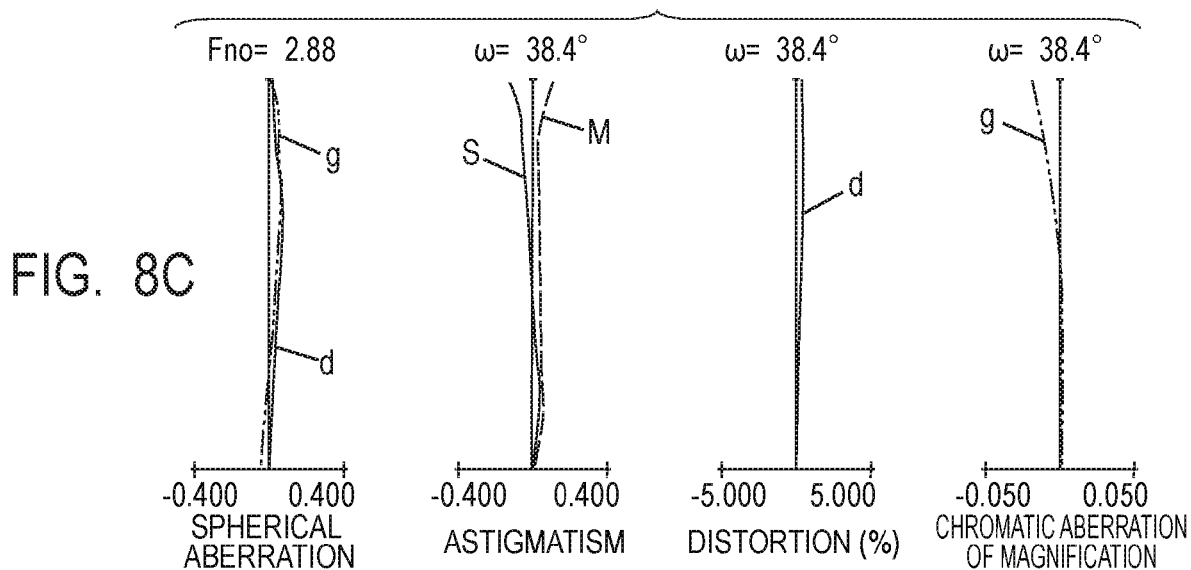

ZOOM LENS AND IMAGE PICKUP APPARATUS INCLUDING THE SAME

BACKGROUND OF THE INVENTION

Field of the Invention

The aspect of the embodiments relates to a zoom lens, which is suited to be used as an image pickup optical system for an image pickup apparatus such as a digital still camera, a video camera, a TV camera, and a monitoring camera.

Description of the Related Art

In recent years, an image pickup optical system used in an image pickup apparatus has been required to be a zoom lens having high performance (high resolution) over an entire object distance, in addition to having a small size of the entire system, a large aperture ratio, and a wide angle of view. Among such zoom lenses, as a zoom lens having a wide angle of view, specifically, having an image pickup full angle of view of about 100 degrees, there has been known a negative-lead-type zoom lens in which a lens unit having a negative refractive power precedes other lens units (is located closest to an object side).

In each of U.S. Patent Application Publication No. 2014/0307152 and Japanese Patent Application Laid-Open No. 2017-146393, there is disclosed a zoom lens consisting of a first lens unit having a negative refractive power, a second lens unit having a positive refractive power, a third lens unit having a negative refractive power, and a fourth lens unit having a positive refractive power, and having a wide angle of view, specifically, having an image pickup full angle of view of about 100 degrees at a wide angle end. Of those zoom lenses, in U.S. Patent Application Publication No. 2014/0307152, there is disclosed a zoom lens having a large aperture ratio, specifically, having an F-number of from 2.91 to 4.10. Further, in Japanese Patent Application Laid-Open No. 2017-146393, there is disclosed a zoom lens having a large aperture ratio, specifically, having an F-number of 4.10.

In the negative-lead-type zoom lens, it is relatively easy to increase the angle of view while downsizing the entire system. However, in a lens configuration of the negative-lead-type zoom lens, lenses are arranged to be asymmetric with respect to an aperture stop. Thus, when the angle of view and the aperture ratio are increased, a large amount of various aberrations including distortion is generated, and it becomes difficult to correct those aberrations. In particular, in a zoom lens having a wide angle range including an image pickup angle of view of more than 100 degrees, a large amount of various aberrations is generated.

In the negative-lead-type zoom lens, in order to obtain high optical performance over the entire zoom range while downsizing the entire system and securing a wide angle of view and a large aperture ratio, it is important to appropriately set each lens unit included in the zoom lens. In particular, it is important to appropriately set a lens configuration of the first lens unit having a negative refractive power. For example, in order to increase the angle of view while reducing an effective radius of a front lens (effective radius of the first lens unit), the negative refractive power of the first lens unit is to be increased.

However, when the negative refractive power of the first lens unit is increased, various aberrations including chromatic aberration of magnification and distortion are increased in the wide angle range, and it becomes difficult to correct those aberrations. Therefore, unless the lens configuration of the first lens unit is appropriate, the entire system of the zoom lens is upsized when the angle of view is increased, and further, variations of various aberrations accompanying zooming are increased, and hence it becomes greatly difficult to obtain high optical performance over the entire zoom range and over the entire screen.

SUMMARY OF THE INVENTION

According to one embodiment of the disclosure, there is provided a zoom lens including, in order from an object side to an image side: a first lens unit having a negative refractive power; a second lens unit having a positive refractive power; and a rear lens group including a plurality of lens units, in which an interval between each pair of adjacent lens units is changed for zooming, the first lens unit is configured to move for zooming, the rear lens group includes at least one lens unit having a negative refractive power, wherein conditional expressions:

$$-3.2 < f1/fw < -1.66;$$

$$1.45 < f2/fw < 20.00;$$

$$8.0 < Lw/skw < 50.0; \text{ and}$$

$$-10.0 < f1/skw < -1.2,$$

are satisfied where f1 represents a focal length of the first lens unit, f2 represents a focal length of the second lens unit, fw represents a focal length of the zoom lens at the wide angle end, Lw represents a total length of the zoom lens at the wide angle end, and skw represents a back focus at the wide angle end.

Further features of the disclosure will become apparent from the following description of exemplary embodiments with reference to the attached drawings.

BRIEF DESCRIPTION OF THE DRAWINGS

FIG. 4A is aberration diagrams of the zoom lens according to Example 2 at the wide angle end when the zoom lens is focused at infinity.

FIG. 4B is aberration diagrams of the zoom lens according to Example 2 at an intermediate zoom position when the zoom lens is focused at infinity.

FIG. 4C is aberration diagrams of the zoom lens according to Example 2 at a telephoto end when the zoom lens is focused at infinity.

FIG. 8A is aberration diagrams of the zoom lens according to Example 4 at the wide angle end when the zoom lens is focused at infinity.

FIG. 8B is aberration diagrams of the zoom lens according to Example 4 at an intermediate zoom position when the zoom lens is focused at infinity.

FIG. 8C is aberration diagrams of the zoom lens according to Example 4 at a telephoto end when the zoom lens is focused at infinity.

DESCRIPTION OF THE EMBODIMENTS

Now, exemplary embodiments of the disclosure are described in detail with reference to the attached drawings.

A zoom lens according to one Example of the aspect of the embodiments includes a plurality of lens units, and an interval between each pair of adjacent lens units is changed during zooming. Specifically, the zoom lens includes, in order from an object side to an image side, a first lens unit having a negative refractive power, a second lens unit having a positive refractive power, and a rear lens group including a plurality of lens units. At least the first lens unit is configured to move during zooming, and an interval between each pair of adjacent lens units is changed during zooming.

Figure 1:
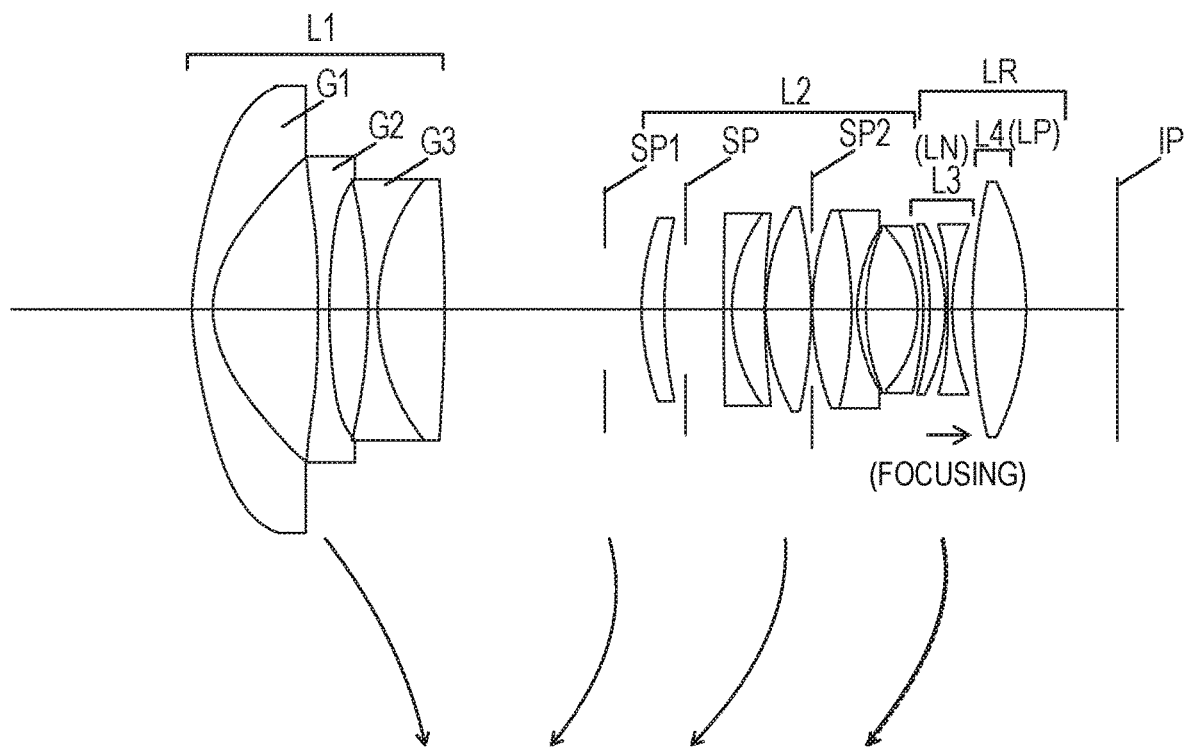
FIG. 1 is a lens cross-sectional view of a zoom lens according to Example 1 of the aspect of the embodiments when the zoom lens is focused at infinity at a wide angle end.
Figure 2A:
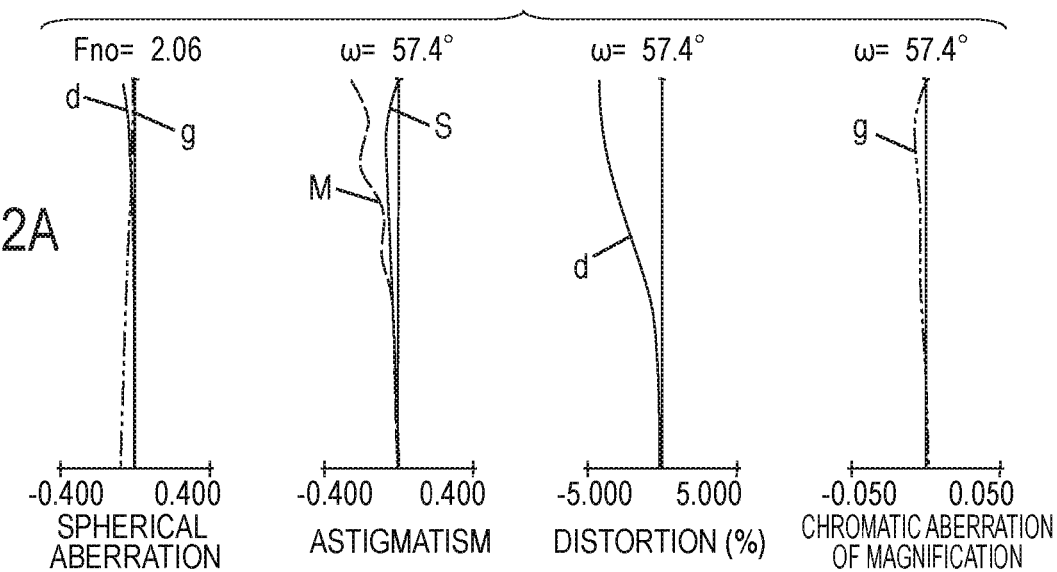
FIG. 2A is aberration diagrams of the zoom lens according to Example 1 at the wide angle end when the zoom lens is focused at infinity.
Figure 2B:
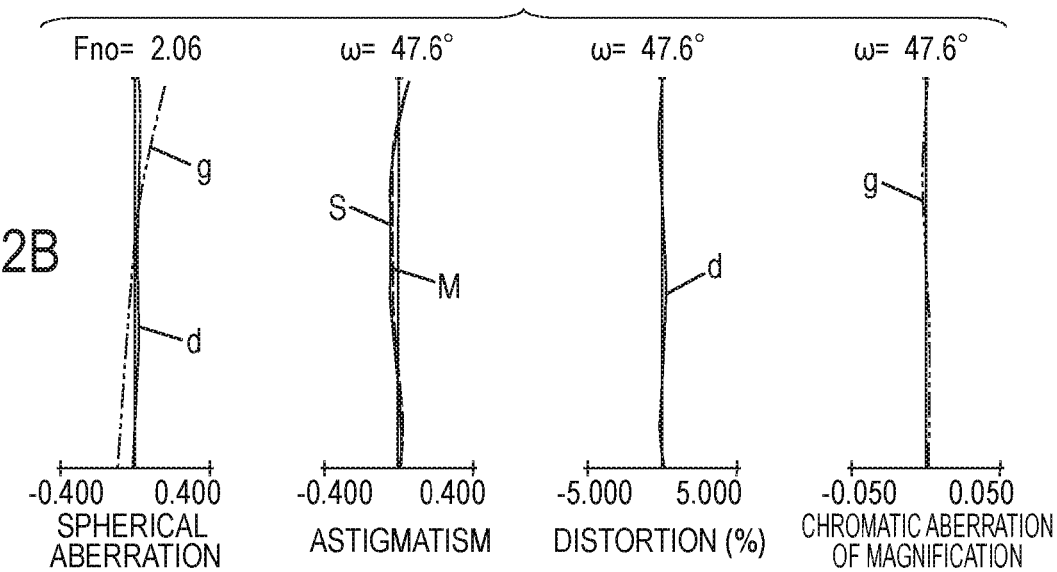
FIG. 2B is aberration diagrams of the zoom lens according to Example 1 at an intermediate zoom position when the zoom lens is focused at infinity.
Figure 2C:
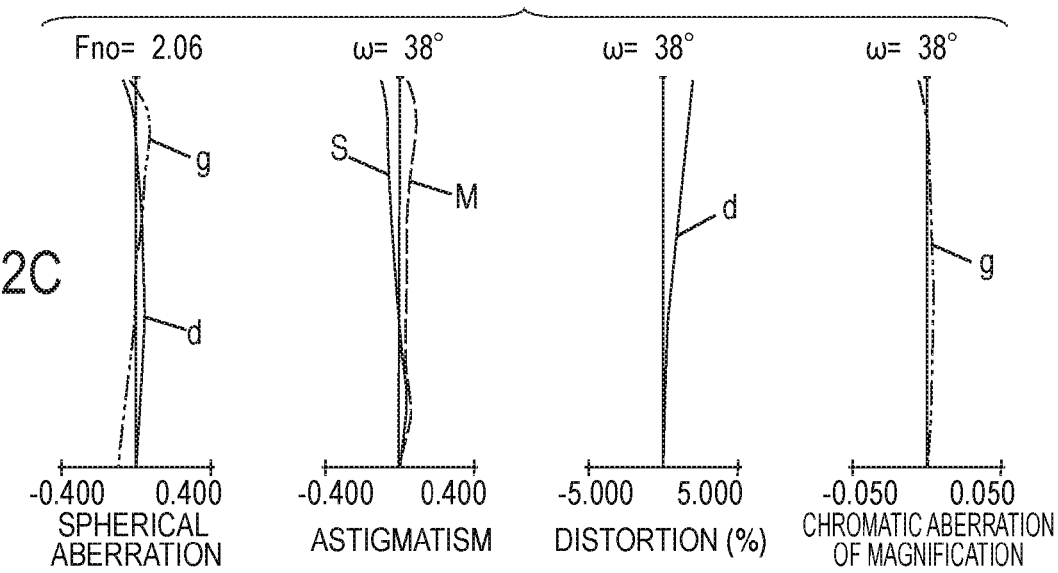
FIG. 2C is aberration diagrams of the zoom lens according to Example 1 at a telephoto end when the zoom lens is focused at infinity.

FIG. 1 is a lens cross-sectional view of a zoom lens according to Example 1 of the aspect of the embodiments at a wide angle end (short focal length end). FIG. 2A, FIG. 2B, and FIG. 2C are aberration diagrams of the zoom lens according to Example 1 at the wide angle end, at an intermediate zoom position, and at a telephoto end (long focal length end), respectively, when the zoom lens is focused at infinity. The zoom lens of Example 1 has a zoom ratio of 1.88, an aperture ratio (F-number) of 2.06, and an image pickup half angle of view of from about 56.32 degrees to about 38.54 degrees. In the following, aberration diagrams are ones obtained when the zoom lens is focused at infinity.

Figure 3:
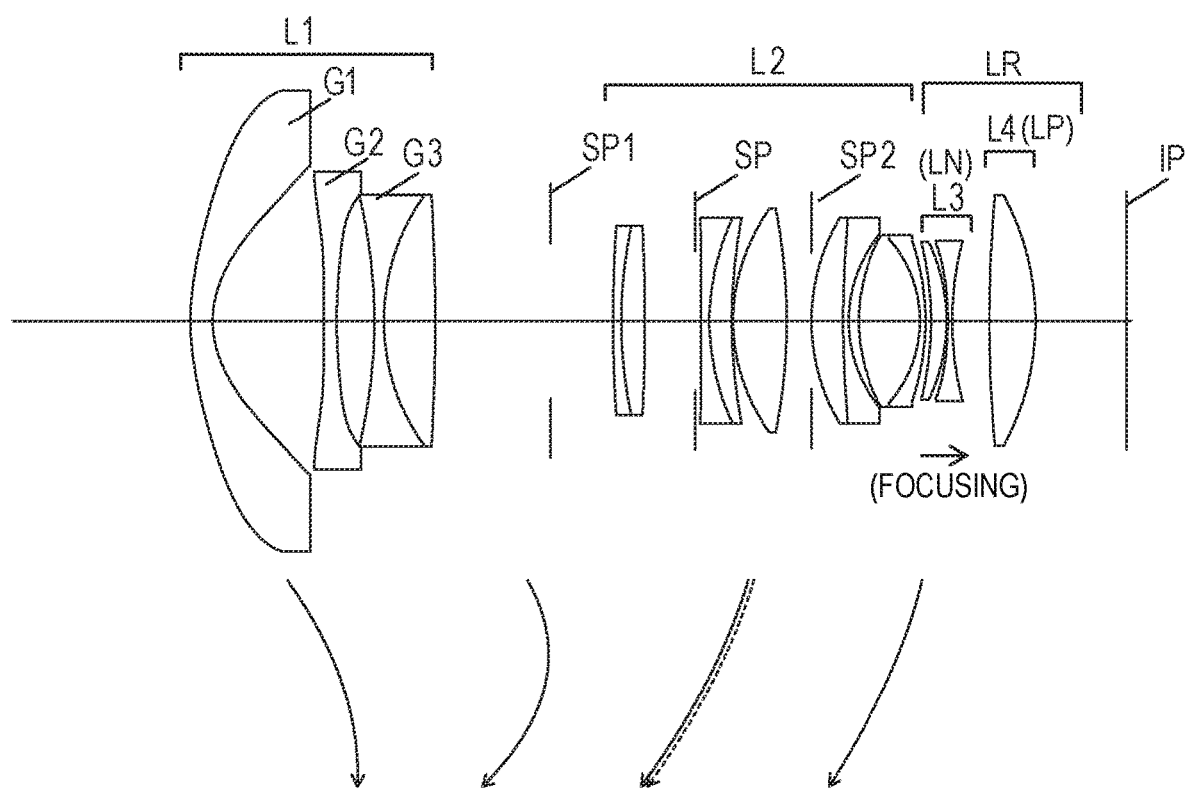
FIG. 3 is a lens cross-sectional view of a zoom lens according to Example 2 of the aspect of the embodiments when the zoom lens is focused at infinity at a wide angle end.

FIG. 3 is a lens cross-sectional view of a zoom lens according to Example 2 at a wide angle end. FIG. 4A, FIG. 4B, and FIG. 4C are aberration diagrams of the zoom lens according to Example 2 at the wide angle end, at an intermediate zoom position, and at a telephoto end, respectively. The zoom lens of Example 2 has a zoom ratio of 1.88, an aperture ratio of about 2.06, and an image pickup half angle of view of from about 56.32 degrees to about 38.54 degrees.

Figure 5:
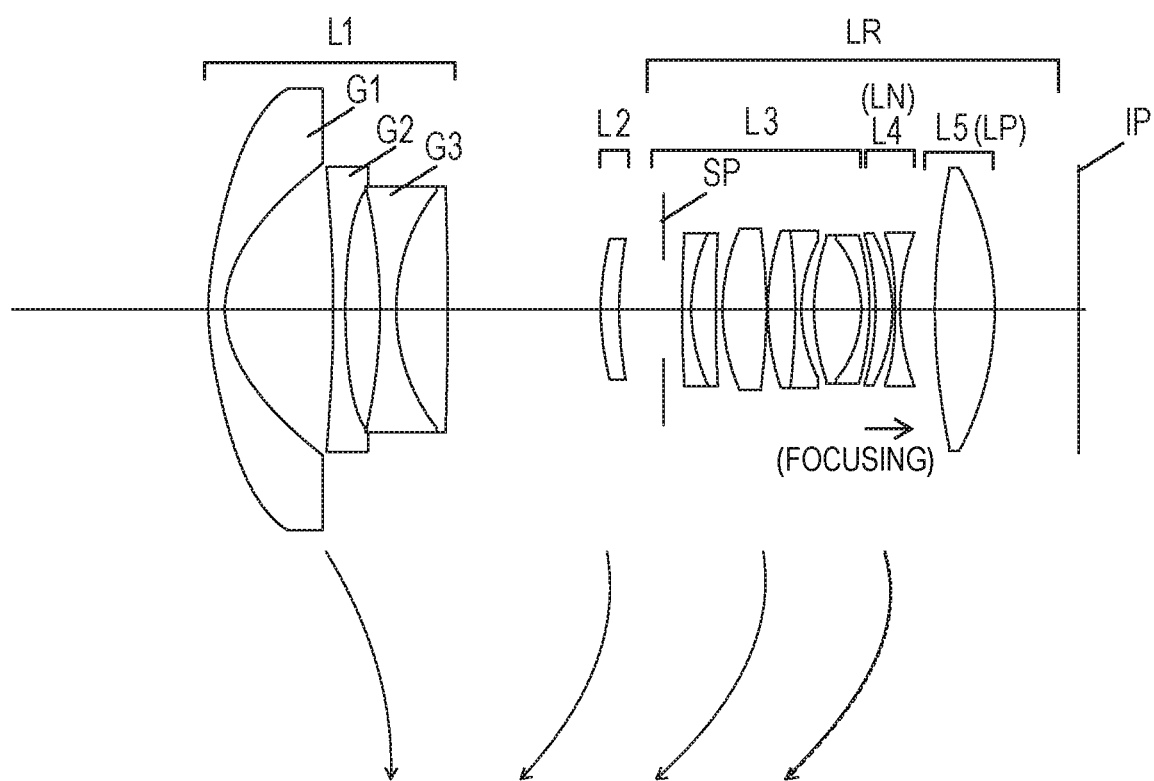
FIG. 5 is a lens cross-sectional view of a zoom lens according to Example 3 of the aspect of the embodiments when the zoom lens is focused at infinity at a wide angle end.
Figure 6A:
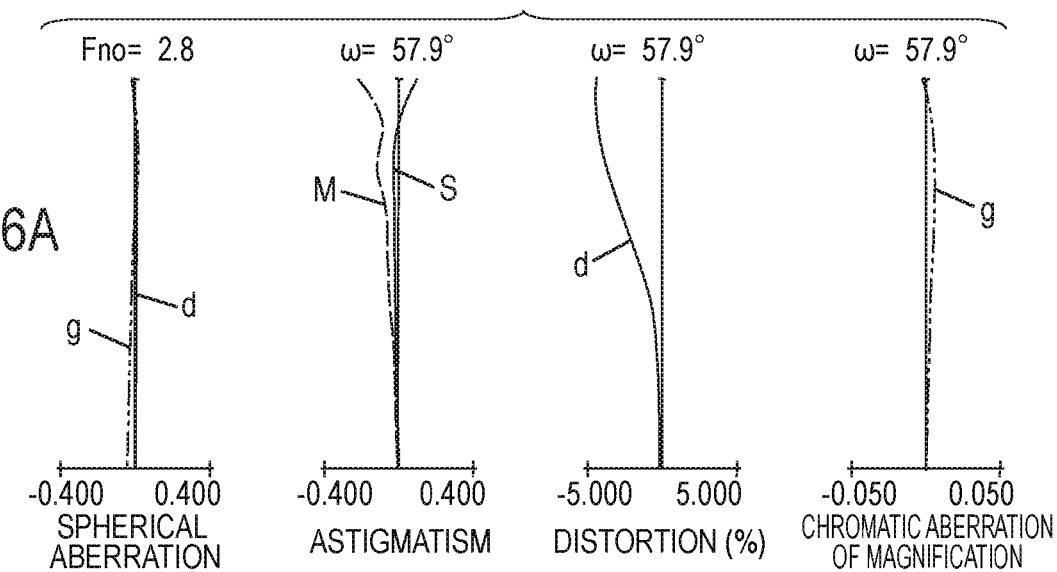
FIG. 6A is aberration diagrams of the zoom lens according to Example 3 at the wide angle end when the zoom lens is focused at infinity.
Figure 6B:
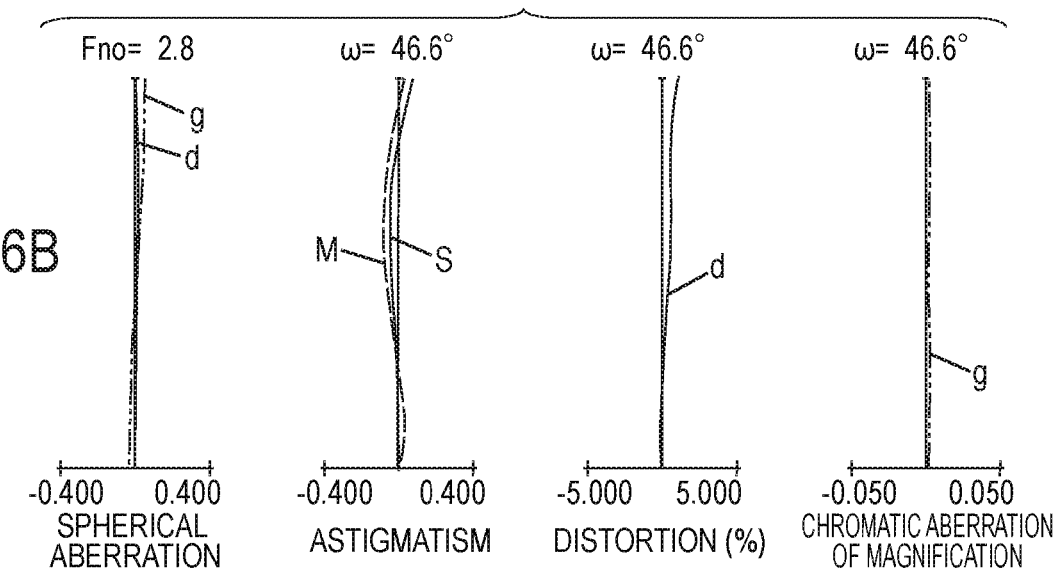
FIG. 6B is aberration diagrams of the zoom lens according to Example 3 at an intermediate zoom position when the zoom lens is focused at infinity.
Figure 6C:
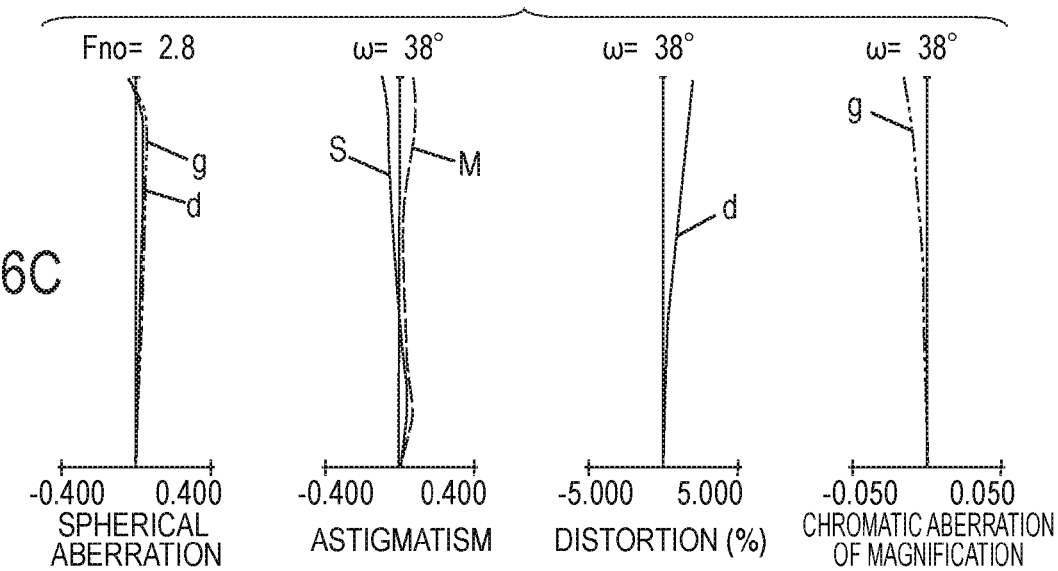
FIG. 6C is aberration diagrams of the zoom lens according to Example 3 at a telephoto end when the zoom lens is focused at infinity.

FIG. 5 is a lens cross-sectional view of a zoom lens according to Example 3 at a wide angle end. FIG. 6A, FIG. 6B, and FIG. 6C are aberration diagrams of the zoom lens according to Example 3 at the wide angle end, at an intermediate zoom position, and at a telephoto end, respectively. The zoom lens of Example 3 has a zoom ratio of 1.91, an aperture ratio of 2.80, and an image pickup half angle of view of from about 56.72 degrees to about 38.54 degrees.

Figure 7:
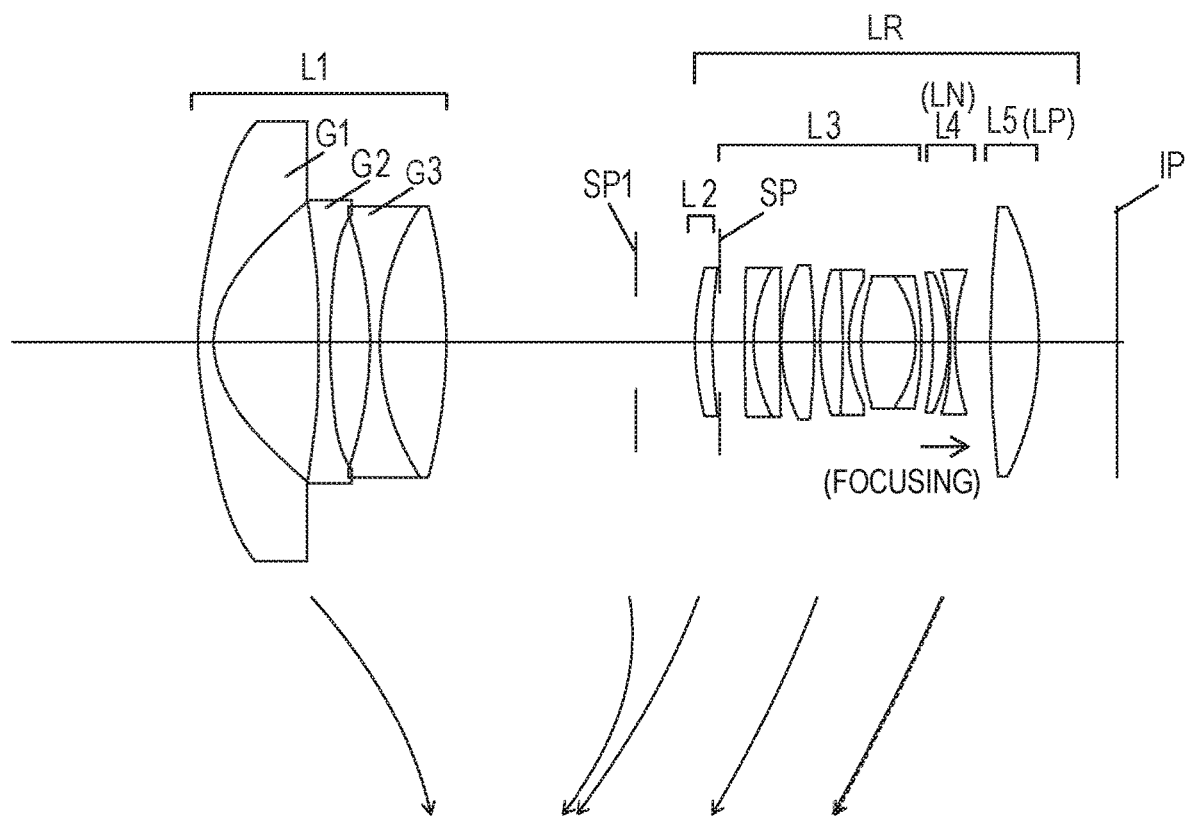
FIG. 7 is a lens cross-sectional view of a zoom lens according to Example 4 of the aspect of the embodiments when the zoom lens is focused at infinity at a wide angle end.

FIG. 7 is a lens cross-sectional view of a zoom lens according to Example 4 at a wide angle end. FIG. 8A, FIG. 8B, and FIG. 8C are aberration diagrams of the zoom lens according to Example 4 at the wide angle end, at an intermediate zoom position, and at a telephoto end, respectively. The zoom lens of Example 4 has a zoom ratio of 1.91, an aperture ratio of 2.88, and an image pickup half angle of view of from about 56.72 degrees to about 38.54 degrees.

Figure 9:
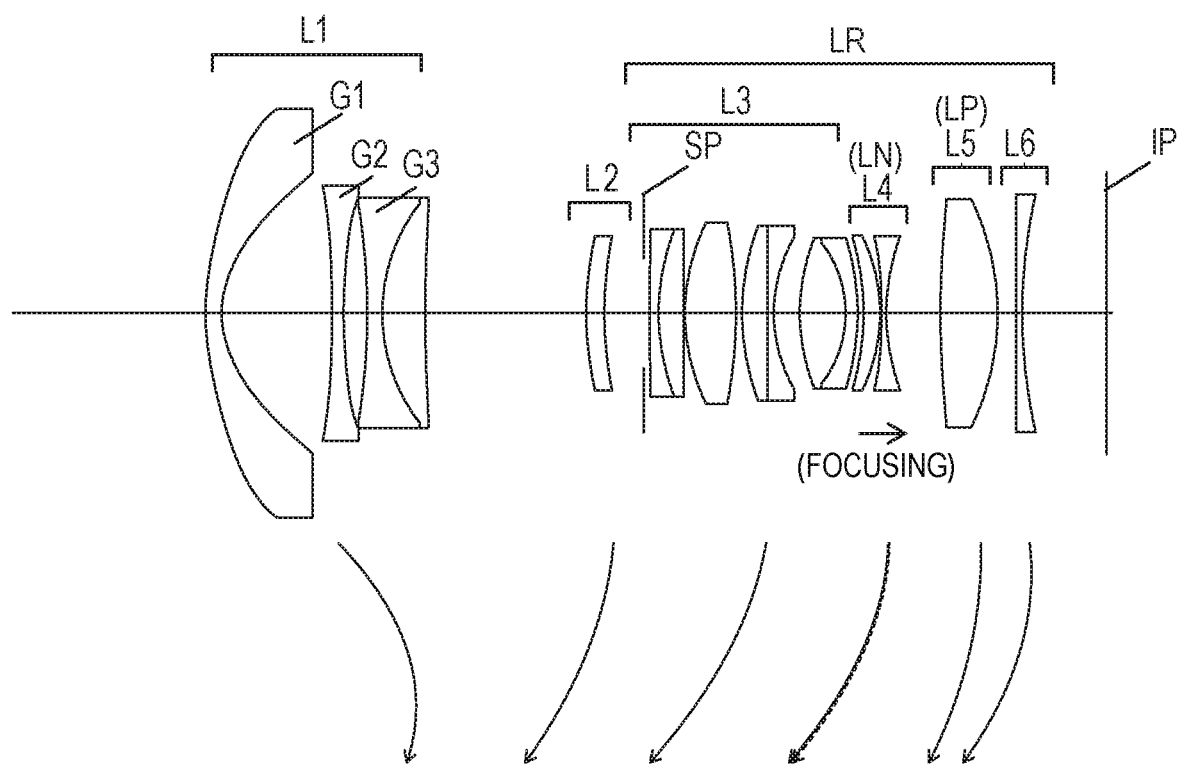
FIG. 9 is a lens cross-sectional view of a zoom lens according to Example 5 of the aspect of the embodiments when the zoom lens is focused at infinity at a wide angle end.
Figure 10A:
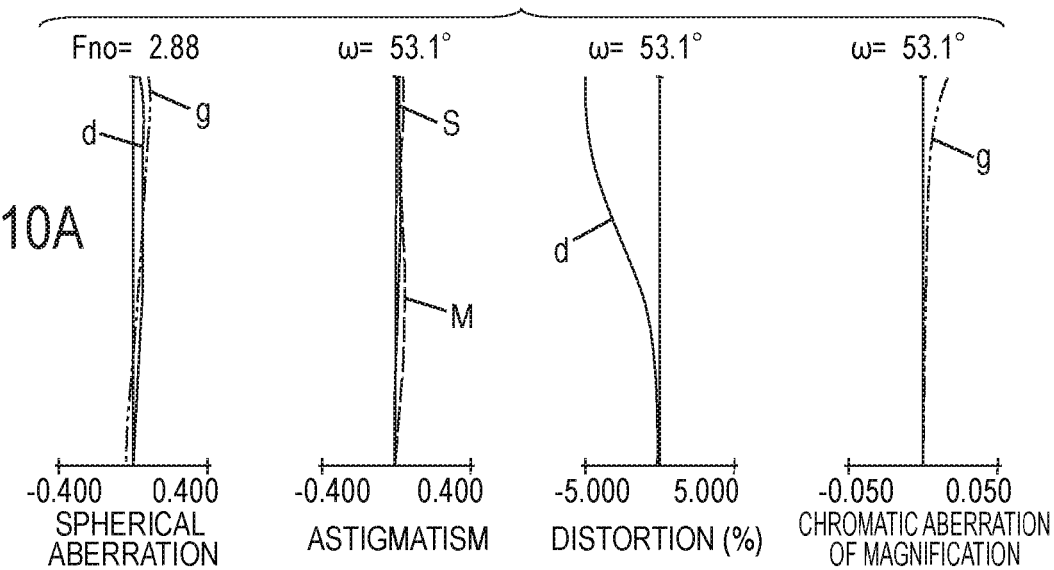
FIG. 10A is aberration diagrams of the zoom lens according to Example 5 at the wide angle end when the zoom lens is focused at infinity.
Figure 10B:
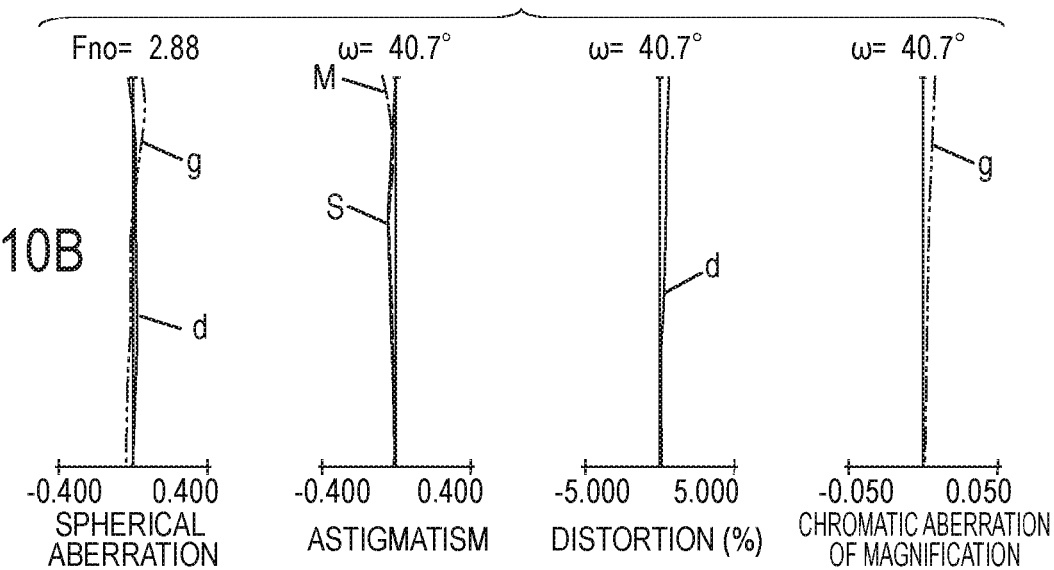
FIG. 10B is aberration diagrams of the zoom lens according to Example 5 at an intermediate zoom position when the zoom lens is focused at infinity.
Figure 10C:
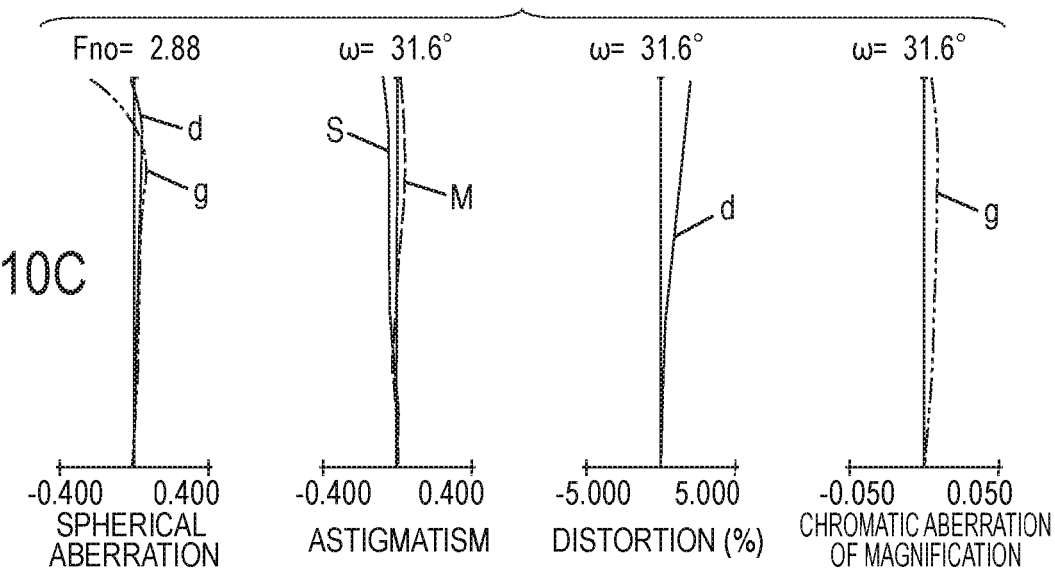
FIG. 10C is aberration diagrams of the zoom lens according to Example 5 at a telephoto end when the zoom lens is focused at infinity.

FIG. 9 is a lens cross-sectional view of a zoom lens according to Example 5 at a wide angle end. FIG. 10A, FIG. 10B, and FIG. 10C are aberration diagrams of the zoom lens according to Example 5 at the wide angle end, at an intermediate zoom position, and at a telephoto end, respectively. The zoom lens of Example 5 has a zoom ratio of 2.02, an aperture ratio of 2.88, and an image pickup half angle of view of from about 51.72 degrees to about 32.09 degrees.

Figure 11:
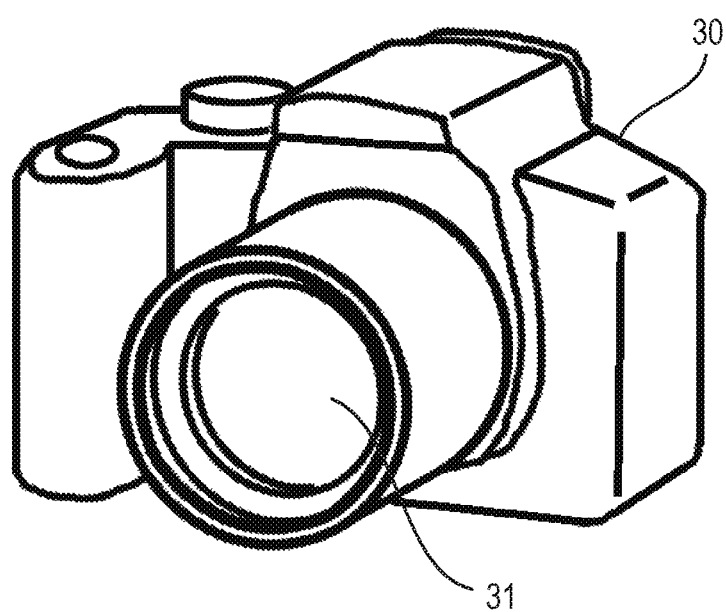
FIG. 11 is a schematic view of a main part of an image pickup apparatus according to one embodiment of the disclosure.
Figure 12:
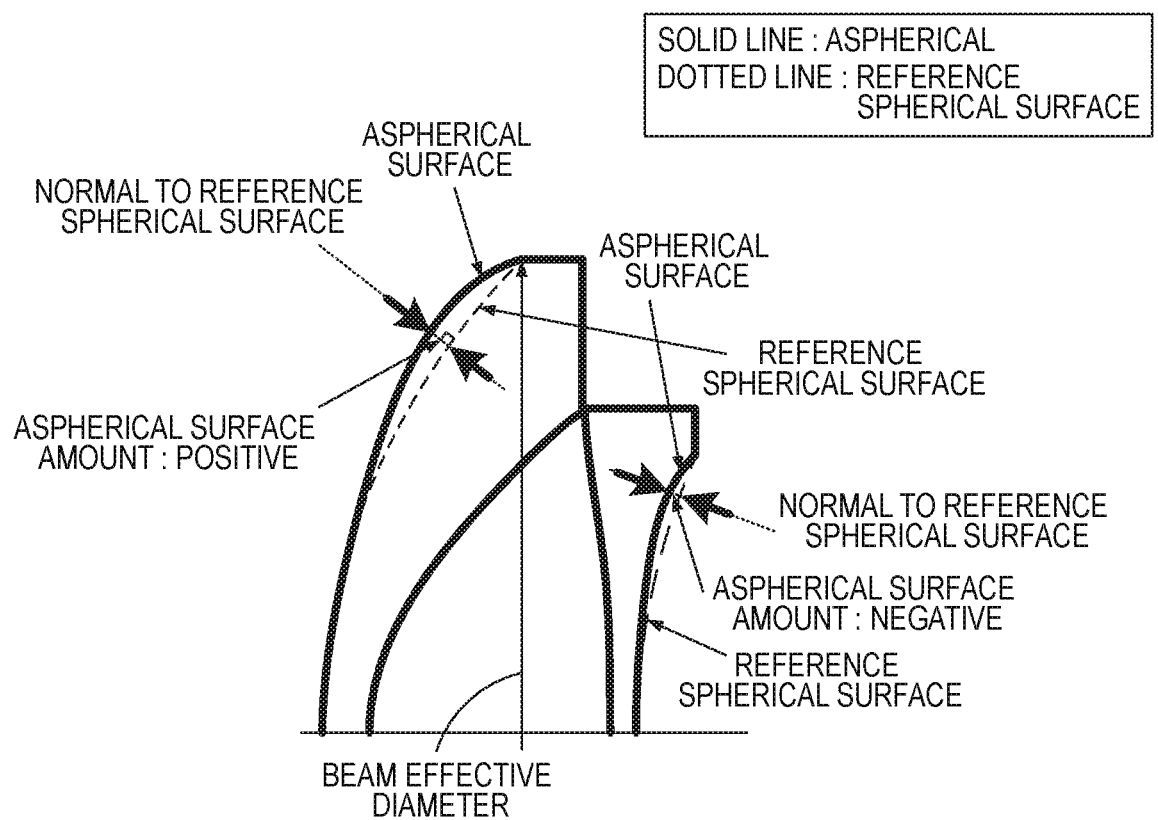
FIG. 12 is an explanatory diagram of an aspherical surface shape.

FIG. 11 is a schematic view of a main part of an image pickup apparatus including the zoom lens according to one Example of the aspect of the embodiments. FIG. 12 is an explanatory diagram of an aspherical surface shape.

The zoom lens according to each Example is an image pickup optical system to be used in an image pickup apparatus such as a digital still camera and a video camera. In the lens cross-sectional views, the left side is the object side (front side), and the right side is the image side (rear side). The zoom lens according to each Example may also be used as a projection optical system for a projection apparatus (projector). In this case, the left side corresponds to a screen, and the right side corresponds to a surface onto which an image is to be projected. In the lens cross-sectional views, Li denotes an i-th lens unit. There are arranged a first lens unit L1 having a negative refractive power (optical power is reciprocal of focal length) and a second lens unit L2 having a positive refractive power. There is also arranged a rear lens group LR including at least two lens units.

There is also arranged a lens unit LN having a negative refractive power, which is arranged closest to the object side among lens units having a negative refractive power included in the rear lens group LR. There is also arranged a lens unit LP having a positive refractive power, which is arranged closest to the image side among lens units having a positive refractive power included in the rear lens group LR.

In Examples 1 and 2, the rear lens group LR consists of, in order from the object side to the image side, a third lens unit having a negative refractive power (lens unit LN) and a fourth lens unit having a positive refractive power (lens unit LP).

In Examples 3 and 4, the rear lens group LR consists of, in order from the object side to the image side, a third lens unit having a positive refractive power, a fourth lens unit having a negative refractive power (lens unit LN), and a fifth lens unit having a positive refractive power.

In Example 5, the rear lens group LR consists of, in order from the object side to the image side, a third lens unit having a positive refractive power, a fourth lens unit having a negative refractive power (lens unit LN), a fifth lens unit having a positive refractive power (lens unit LP), and a sixth lens unit having a negative refractive power.

A photographing light flux diameter determining member with a variable aperture diameter (hereinafter referred to as an "aperture stop") SP controls a photographing light flux diameter corresponding to an aperture value at the photographing. IP represents an image plane. When the zoom lens is used as an image pickup optical system of a video camera or a digital still camera, an image pickup plane of a solid-state image pickup element (photoelectric conversion element), such as a CCD sensor or a CMOS sensor, is arranged.

In the spherical aberration diagrams, the solid line "d" indicates the d-line (wavelength: 587.6 nm), and the two-dot chain line "g" indicates the g-line (wavelength: of 435.8 nm). In the astigmatism diagrams, the dotted line M indicates a meridional image plane at the d-line, and the solid line S indicates a sagittal image plane at the d-line. Distortion indicates distortion with respect to the d-line. In addition, the chromatic aberration of magnification indicates a difference of the g-line with reference to the d-line.

Fno represents an F-number. A symbol "ω" represents an image pickup half angle of view (degrees). In the following Examples, the wide angle end and the telephoto end are zoom positions at the time when a magnification-varying lens unit is located at each end of a mechanically movable range on the optical axis. In the lens cross-sectional views, the arrow indicates a movement locus of each lens unit for zooming from the wide angle end to the telephoto end. The arrow regarding "focusing" indicates a movement direction of the lens unit during focusing from infinity to close distance.

The zoom lens according to each Example is now described. The zoom lens according to each Example consists of, in order from the object side to the image side, the first lens unit L1 having a negative refractive power, the second lens unit L2 having a positive refractive power, and the rear lens group LR including a plurality of lens units. Further, an interval between each pair of adjacent lens units is changed during zooming.

In each Example, the rear lens group LR includes at least one lens unit having a negative refractive power, and the first lens unit L1 includes, in order from the object side to the image side, three lenses of a negative lens (first negative lens) G1, a negative lens (second negative lens) G2, and a negative lens (third negative lens) G3.

In each Example, a ratio of a focal length of the first lens unit L1 to a focal length of the zoom lens at the wide angle end, a ratio of a focal length of the second lens unit L2 to the focal length of the zoom lens at the wide angle end, and a ratio of a total length of the zoom lens to a back focus at the wide angle end are defined. Further, for example, a ratio of the focal length of the first lens unit L1 to the back focus at the wide angle end is appropriately defined.

The focal length of the first lens unit L1 is represented by f1, the focal length of the second lens unit L2 is represented by f2, the focal length of the entire system of the zoom lens at the wide angle end is represented by "fw", a distance from a lens surface closest to the object side to an image point at the wide angle end is represented by Lw, and the back focus at the wide angle end is represented by "skw".

At this time, the following conditional expressions are satisfied.

$$-3.2 < f1/fw < -1.66 \quad (1)$$

$$1.45 < f2/fw < 20.00 \quad (2)$$

$$8.0 < Lw/skw < 50.0 \quad (3)$$

$$-10.0 < f1/skw < -1.2 \quad (2)$$

In each Example, the zoom lens includes the first lens unit L1 having a negative refractive power and the second lens unit L2 having a positive refractive power, which is configured to move during zooming. An optical action exerted by this lens configuration is now described.

In a zoom locus of the zoom lens of each Example, the first lens unit L1 and the second lens unit L2 and the subsequent lens unit are separated from each other at the wide angle end, whereas the first lens unit L1 and the second lens unit L2 and the subsequent lens unit become closer to each other at the telephoto end. At the wide angle end, the first lens unit L1 having a negative refractive power and the second lens unit L2 having a positive refractive power are arranged to be separated from each other, and hence an absolute value of a lateral magnification of the second lens unit L2 at the wide angle end can be reduced, and an entrance pupil can be pushed toward the object side.

As a result, the lens configuration in each Example is advantageous in increasing the angle of view and in downsizing and reduction in weight of the zoom lens. Further, through arrangement of the three negative lenses in the first lens unit L1 in order from the object side, the angle of view is increased while upsizing of a lens effective radius is suppressed. In addition, through satisfaction of the conditional expressions (1) to (4), high optical performance is obtained over the entire zoom range with a small F-number while the angle of view is increased.

Next, a technical meaning of each of the conditional expressions given above is described. The conditional expression (1) defines a relationship between the focal length of the first lens unit L1 and the focal length of the zoom lens at the wide angle end. Through satisfaction of the conditional expression (1), high optical performance is efficiently obtained while the effective radius of the first lens unit L1 is downsized. When the ratio of the conditional expression (1) falls below the lower limit of the conditional expression (1), the negative refractive power of the first lens unit L1 becomes too weaker (the absolute value of the negative refractive power becomes too smaller), and the effective radius of the first lens unit L1 increases.

When the ratio of the conditional expression (1) exceeds the upper limit of the conditional expression (1), the negative refractive power of the first lens unit L1 becomes too stronger (the absolute value of the negative refractive power becomes too larger). Thus, a height of incidence of an axial ray entering the second lens unit L2 and the subsequent lens unit is increased, and it becomes difficult to correct spherical aberration and comatic aberration at the telephoto end.

The conditional expression (2) defines a relationship between the focal length of the second lens unit L2 and the focal length of the zoom lens at the wide angle end. Through satisfaction of the conditional expression (2), high optical performance is efficiently obtained while the zoom ratio is increased and the zoom lens is downsized. When the ratio of the conditional expression (2) falls below the lower limit of the conditional expression (2), the positive refractive power of the second lens unit L2 becomes too stronger, and variations of aberrations are increased during zooming. Thus, it becomes difficult to correct various aberrations.

When the ratio of the conditional expression (2) exceeds the upper limit of the conditional expression (2), the positive refractive power of the second lens unit L2 becomes too weaker. Thus, the movement amount of the second lens unit L2 during zooming is increased, and the distance between the first lens unit L1 and the aperture stop SP becomes larger. As a result, the effective radius of the first lens unit L1 is disadvantageously increased, and it becomes difficult to increase the zoom ratio and to downsize the zoom lens and reduce the weight thereof.

The conditional expression (3) defines a relationship between the total length of the zoom lens at the wide angle end, that is, the distance from the lens surface closest to the object side to a position of the image point, and the back focus. When the ratio of the conditional expression (3) falls below the lower limit of the conditional expression (3), the negative refractive power of the first lens unit L1 is to be increased in order to secure a long back focus. In this case, the effective radii of the second lens unit L2 and the subsequent lens unit are increased, and it becomes difficult to downsize the zoom lens and reduce the weight thereof. When the ratio of the conditional expression (3) falls below the lower limit of the conditional expression (3), the back focus becomes too shorter, and it becomes difficult to arrange an optical filter, for example, a low-pass filter, between the zoom lens and an image pickup element.

The back focus "skw" represents the distance from the lens surface closest to the image side in the zoom lens to the image plane. The thickness of an optical member that is inserted in the zoom lens as the last element and has substantially no refractive power, such as cover glass, a prism, and a low-pass filter, is an air-equivalent value.

The conditional expression (4) defines a relationship between the focal length of the first lens unit L1 and the back focus at the wide angle end. When the ratio of the conditional expression (4) falls below the lower limit of the conditional expression (4), the back focus becomes too shorter, and it becomes difficult to arrange the optical filter, for example, the low-pass filter, between the zoom lens and the image pickup element. When the ratio of the conditional expression (4) exceeds the upper limit of the conditional expression (4), the negative refractive power of the first lens unit L1 becomes too stronger, and the height of incidence of the axial ray entering the second lens unit L2 and the subsequent lens unit becomes higher. Thus, it becomes difficult to correct spherical aberration and comatic aberration at the telephoto end.

In each Example, through satisfaction of the conditional expressions (1) to (4), the zoom lens having a wide of view, a small F-number, and high optical performance over the entire zoom range is obtained. Specifically, the zoom lens having high optical performance, which has an F-number of from 2.0 to 2.8, an image pickup angle of view at the wide angle end of from about 100 degrees to about 120 degrees, and a zoom ratio of from about 1.8 to about 2.0, is obtained.

In one embodiment, the respective numerical ranges of the conditional expressions (1) to (4) are set as follows.

$$-3.00 < f1/fw < -1.75 \quad (1a)$$

$$2.00 < f2/fw < 18.00 \quad (2a)$$

$$8.5 < Lw/skw < 20.0 \quad (3a)$$

$$-5.00 < f1/skw < -1.25 \quad (4a)$$

In each Example, at least one of the following conditional expressions is satisfied. A focal length of the lens unit LN having a negative refractive power, which is arranged closest to the object side among the lens units having a negative refractive power included in the rear lens group LR, is represented by "fn". The rear lens group LR includes at least one lens unit having a positive refractive power, and a focal length of the lens unit LP having a positive refractive power, which is arranged closest to the image side among the lens units having a positive refractive power included in the rear lens group LR, is represented by "fp". At this time, at least one of the following conditional expressions is satisfied.

$$0.3 < f1/fn < 5.0 \quad (5)$$

$$-2.0 < f1/fp < -0.2 \quad (6)$$

Next, a technical meaning of each of the conditional expressions given above is described. The conditional expression (5) defines a relationship between the focal length of the first lens unit L1 and the focal length of the lens unit LN having a negative refractive power, which is closest to the object side among the lens units subsequent to the second lens unit L2. When the ratio of the conditional expression (5) falls below the lower limit of the conditional expression (5), the negative refractive power of the lens unit LN becomes too stronger, and it becomes difficult to correct variations of aberrations accompanying zooming. When the ratio of the conditional expression (5) exceeds the upper limit of the conditional expression (5), the refractive power of the negative lens unit LN becomes too weaker, and the movement amount of the lens unit LN during zooming is increased. Thus, the lens system is upsized.

The conditional expression (6) defines a relationship between the focal length of the first lens unit L1 and the focal length of the lens unit LP having a positive refractive power, which is positioned closest to the image side among the lens units included in the rear lens group LR. When the ratio of the conditional expression (6) falls below the lower limit of the conditional expression (6) and the positive refractive power of the lens unit LP becomes too stronger, it becomes difficult to correct variations of aberrations accompanying zooming. When the ratio of the conditional expression (6) exceeds the upper limit of the conditional expression (6) and the positive refractive power of the lens unit LP becomes too weaker, it becomes difficult to secure a back focus of a predetermined amount. In each Example of one embodiment, in order to correct aberrations, the respective numerical ranges of the conditional expressions (5) and (6) are set as follows.

$$0.4 < f1/fn < 2.0 \quad (5a)$$

$$-1.0 < f1/fp < -0.3 \quad (6a)$$

In the zoom lens according to each Example, in one embodiment, the second lens unit L2 is to be configured to move during zooming. Through movement of the second lens unit L2 in addition to the first lens unit L1, it becomes easier to achieve downsizing and reduction in weight of the zoom lens and an increase of the zoom ratio. Further, through movement of the second lens unit L2 having a positive refractive power, the movement amount of the first lens unit L1 can be reduced, and it becomes easier to reduce the effective radius of the first lens unit L1.

Further, in one embodiment, the zoom lens is not included a bending optical system (reflective member) on the object side of the second lens unit L2. When the zoom lens includes the bending optical system, the lens closest to the object side in the first lens unit L1 becomes farther from the aperture stop SP, and the lens effective radius is upsized. Moreover, the negative lens G1 and the negative lens G2 of the first lens unit L1 are to be formed independently of each other. In other words, an air interval exists between the lenses. When the lenses are formed into a cemented lens, the cemented lens is formed by lenses having a large effective radius, and hence in consideration of the difference in linear expansion coefficient between materials of the lenses, manufacturability and stability as a lens decrease.

In one embodiment, the negative lens G1 have an aspherical surface having a positive aspherical surface amount and that the negative lens G2 have an aspherical surface having a negative aspherical surface amount. Now, a definition of the aspherical surface amount formed in a lens surface is described with reference to FIG. 12. As illustrated in FIG. 12, the aspherical surface amount represents a maximum value of an amount of deviation of an aspherical surface from a reference spherical surface. A curvature radius of the reference spherical surface is a radius of a spherical surface determined by a surface apex and a beam effective diameter of the reference spherical surface. When a direction of deviation of the aspherical surface from the reference spherical surface is such a direction as to increase the thickness of a medium from the reference spherical surface, this direction is defined as corresponding to a positive aspherical surface amount. Meanwhile, when the direction of deviation is such a direction as to reduce the thickness of the medium from the reference spherical surface, this direction is defined as corresponding to a negative aspherical surface amount.

In each Example, a lens surface on the object side or the image side of the negative lens G1 has an aspherical surface shape, and an aspherical surface amount of the aspherical surface is to be positive. Further, a lens surface on the object side or the image side of the negative lens G2 has an aspherical surface shape, and that an aspherical surface amount of the aspherical surface is to be negative. In a zoom lens having a wide angle of view, in general, a large amount of distortion is generated from a lens closest to the object side. For this reason, through arrangement of an aspherical lens having a positive aspherical surface amount at a position at which a height of incidence of an off-axial ray is high, it becomes easier to suitably correct distortion.

Further, in each Example, astigmatism generated from the aspherical surface of the negative lens G1 having a positive aspherical surface amount is corrected by arranging the aspherical surface having a negative aspherical surface amount at a position at which the height of incidence of the off-axial ray becomes lower.

Through the definition of each element as described above, the zoom lens having a wide angle of view, a small F-number, and high optical performance over the entire zoom range is achieved.

Next, a lens configuration of the zoom lens according to each Example is described.

Example 1

The zoom lens according to Example 1 consists of, in order from the object side to the image side, the first lens unit L1 having a negative refractive power, the second lens unit L2 having a positive refractive power, and the rear lens group LR. The rear lens group LR consists of the third lens unit L3 having a negative refractive power (lens unit LN) and the fourth lens unit L4 having a positive refractive power (lens unit LP). The zoom lens further includes, between the first lens unit L1 and the second lens unit L2, an auxiliary stop SP1 configured to move independently of other lens units (along different loci) during zooming. The zoom lens further includes, in the second lens unit L2, an aperture stop SP and an auxiliary stop SP2. The third lens unit L3 is configured to move toward the image side during focusing from infinity to proximity.

Example 2

A zoom type of the zoom lens according to Example 2, which includes the number of lens units, a sign of the refractive power of each lens unit, and conditions for movement of each lens unit during zooming, is the same as that of Example 1. The zoom lens further includes, between the first lens unit L1 and the second lens unit L2, the auxiliary stop SP1 configured to move independently of other lens units during zooming. The zoom lens further includes, in the second lens unit L2, the aperture stop SP and the auxiliary stop SP2. The third lens unit L3 is configured to move toward the image side during focusing from infinity to proximity.

Example 3

The zoom lens according to Example 3 consists of, in order from the object side to the image side, the first lens unit L1 having a negative refractive power, the second lens unit L2 having a positive refractive power, and the rear lens group LR. The rear lens group LR consists of the third lens unit L3 having a positive refractive power, the fourth lens unit L4 having a negative refractive power (lens unit LN), the fifth lens unit L5 having a positive refractive power (lens unit LP). The aperture stop SP is arranged in the third lens unit L3. The fourth lens unit L4 is configured to move toward the image side during focusing from infinity to proximity.

Example 4

A zoom type of Example 4 is the same as that of Example 3. The zoom lens further includes, between the first lens unit L1 and the second lens unit L2, an auxiliary stop SP1 configured to move independently during zooming. The fourth lens unit L4 is configured to move toward the image side during focusing from infinity to proximity.

Example 5

The zoom lens according to Example 5 consists of, in order from the object side to the image side, the first lens unit L1 having a negative refractive power, the second lens unit L2 having a positive refractive power, and the rear lens group LR. The rear lens group LR consists of the third lens unit L3 having a positive refractive power, the fourth lens unit L4 having a negative refractive power (lens unit LN), the fifth lens unit L5 having a positive refractive power (lens unit LP), and a sixth lens unit L6 having a negative refractive power. The aperture stop SP is arranged in the third lens unit L3. The fourth lens unit L4 is configured to move toward the image side during focusing from infinity to proximity.

Next, a digital still camera according to one embodiment of the disclosure, which uses the zoom lens according to each Example of the disclosure as an image pickup optical system, is described with reference to FIG. 11. In FIG. 11, the digital still camera includes a camera main body 10 and an image pickup optical system 11 consisting of any one of the zoom lenses described in Examples 1 to 5. A solid-state image pickup element (photoelectric conversion element) 12 is built into the camera main body 10, and is a CCD sensor, a CMOS sensor, or other such element configured to receive an object image formed by the image pickup optical system 11.

Exemplary embodiments of the disclosure have been described above, but the disclosure is not limited to those embodiments, and various changes and modifications can be made thereto within the scope of the gist thereof. For example, the zoom lens according to each Example may not include an image stabilization lens, but may include the image stabilization lens in, for example, the rear lens group. Further, the zoom lens according to each Example may be a zoom lens including not only a refractive optical element (so-called a lens) but also a diffractive optical element.

In the following, numerical data in each Example of the aspect of the embodiments is shown. In each numerical value data set, the order of a surface from the object side is represented by "i". A curvature radius of the i-th surface from the object side is represented by "ri", a lens thickness or an air interval between the i-th surface and the (i+1)th surface from the object side is represented by "di", and a refractive index and an Abbe number of a material of an optical member between the i-th surface and the (i+1)th from the object side are represented by "ni" and "vi", respectively.

A back focus BF is an air-equivalent distance from the last lens surface to the image plane. The total length of the zoom lens is a value obtained by adding the value of the back focus to a distance on the optical axis from the lens surface closest to the object side to the lens surface closest to the image side. The aspherical shape has an X axis set in the optical axis direction, an H axis set in a direction perpendicular to the optical axis, and a direction of travel of light defined as positive. Then, when a paraxial curvature radius is represented by R, a conic constant is represented by "k", and aspherical coefficients are represented by A4, A6, A8, A10, A12, A14, A16, A3, A5, A7, A9, A11, A13, and A15, the aspherical shape is expressed by the following expression.

$$X = \frac{H^2/R}{1+\sqrt{1-(1+k)(H/R)^2}} + A4H^4 + A6H^6 +$$
$$A8H^8 + A10H^{10} + A12H^{12} + A14H^{14} + A16H^{16} + A3H^3 +$$
$$A5H^5 + A7H^7 + A9H^9 + A11H^{11} + A13H^{13} + A15H^{15}$$

Moreover, "e-Z" means "×10$^{-Z}$". Relationships between the above-mentioned respective conditional expressions and various sets of numerical data are shown in Table 1.

[Numerical Data 1]

Unit: mm

Surface data

| Surface number | r | d | nd | vd | Effective diameter |
|---|---|---|---|---|---|
| 1* | 37.791 | 3.65 | 1.67790 | 54.9 | 72.40 |
| 2* | 15.611 | 18.75 | | | 49.95 |
| 3* | −594.510 | 2.00 | 1.90270 | 31.0 | 49.18 |
| 4* | 75.786 | 6.93 | | | 41.90 |
| 5 | −81.443 | 1.70 | 1.59522 | 67.7 | 41.83 |
| 6 | 32.296 | 11.87 | 1.91082 | 35.3 | 41.62 |
| 7 | −228.429 | (Variable) | | | 40.68 |
| 8 | ∞ | (Variable) | | | 27.92 |
| 9* | 38.619 | 4.04 | 1.95375 | 32.3 | 29.05 |
| 10 | 64.460 | 3.74 | | | 28.58 |
| 11 (Stop) | ∞ | 6.76 | | | 28.83 |
| 12 | 514.154 | 1.50 | 1.76182 | 26.5 | 29.67 |
| 13 | 25.619 | 5.79 | 1.53775 | 74.7 | 29.93 |
| 14 | 112.457 | 0.20 | | | 30.47 |
| 15* | 31.918 | 8.05 | 1.43875 | 94.7 | 32.54 |
| 16 | −69.228 | 0.20 | | | 32.56 |
| 17 | ∞ | 0.00 | | | 32.14 |
| 18 | 41.378 | 6.96 | 2.00069 | 25.5 | 31.52 |
| 19 | −61.749 | 1.00 | 1.59551 | 39.2 | 30.55 |
| 20 | 23.778 | 1.52 | | | 25.18 |
| 21 | 31.862 | 9.33 | 1.49700 | 81.5 | 25.22 |
| 22 | −18.596 | 1.00 | 1.85896 | 22.7 | 25.12 |
| 23 | −49.281 | (Variable) | | | 26.32 |
| 24 | −44.362 | 2.72 | 1.95906 | 17.5 | 26.40 |
| 25 | −28.947 | 0.43 | | | 26.88 |
| 26* | −137.371 | 0.80 | 1.90270 | 31.0 | 26.08 |
| 27* | 32.527 | (Variable) | | | 26.79 |
| 28 | 82.868 | 9.51 | 1.49700 | 81.5 | 40.08 |
| 29 | −44.803 | 16.13 | | | 40.93 |
| Image plane | ∞ | | | | |

Aspherical surface data

First surface

K = 0.00000e+000    A4 = −1.79480e−005    A6 = 2.41730e−009
A8 = 1.13762e−011    A10 = −7.00097e−015    A12 = 2.00332e−017
A14 = −3.42565e−021    A16 = 3.27732e−024
A3 = −1.02313e−004    A5 = 5.36476e−007    A7 = −4.27524e−010
A9 = 4.40070e−014    A11 = −4.30405e−016    A13 = 7.83767e−021
A15 = −1.71246e−022

Second surface

K = −6.49173e−001    A4 = −2.56232e−005    A6 = −5.70660e−008
A8 = 2.11114e−011    A10 = 5.72153e−014    A12 = −1.39420e−016
A14 = 3.52760e−019    A16 = −4.60310e−022
A3 = −1.03105e−004    A5 = 1.06161e−006    A7 = 1.83806e−010
A9 = 2.88168e−013    A11 = −2.62918e−015    A13 = −4.12693e−018
A15 = 9.44822e−021

Third surface

K = −1.87217e+003    A4 = −1.30430e−005    A6 = −7.57683e−009
A8 = 8.84942e−011    A10 = −4.30447e−014    A12 = −2.50000e−016
A14 = 4.06665e−019    A16 = −1.86494e−022

Fourth surface

K = 1.00841e+001    A4 = −1.11052e−005    A6 = 3.40378e−009
A8 = 9.83394e−011    A10 = −1.78530e−013    A12 = 2.79102e−016
A14 = −3.60461e−019    A16 = 5.09673e−023

Ninth surface

K = −1.14384e+000    A4 = −1.54183e−007    A6 = 2.15332e−009
A8 = −4.94228e−011    A10 = 2.33122e−013    A12 = −4.32007e−016

Fifteenth surface

K = 1.59731e+000    A4 = −1.07031e−005    A6 = −2.31380e−010
A8 = −5.76138e−011    A10 = 2.05986e−013    A12 = −6.14996e−016

Twenty-sixth surface

K = −6.75894e+001    A4 = −3.15850e−005    A6 = 7.17207e−008
A8 = −5.82007e−010    A10 = 2.41481e−012    A12 = −4.76753e−015

Twenty-seventh surface

K = 8.38581e−002    A4 = −9.52121e−006    A6 = 5.87164e−008
A8 = −4.63121e−010    A10 = 1.80935e−012    A12 = −3.10520e−015

Various data
Zoom ratio 1.88

| | Wide angle | Intermediate | Telephoto |
|---|---|---|---|
| Focal length | 14.42 | 19.78 | 27.16 |
| F-number | 2.06 | 2.06 | 2.06 |
| Half angle of view (degrees) | 56.32 | 47.56 | 38.54 |

-continued

Unit: mm

| | | |
|---|---|---|
| Image height | 21.64 21.64 21.64 |
| Total lens length | 164.32 150.29 146.47 |
| BF | 16.13 16.13 16.13 |
| d7 | 28.51 12.28 0.20 |
| d8 | 6.50 2.00 0.20 |
| d23 | 1.15 2.98 4.30 |
| d27 | 3.58 8.46 17.20 |
| Entrance pupil position | 27.74 25.35 23.01 |
| Exit pupil position | −71.51 −101.69 −207.80 |
| Front principal point position | 39.78 41.82 46.88 |
| Rear principal point position | 1.71 −3.65 −11.03 |

Lens unit data

| Unit | First surface | Focal length | Lens unit structure length | Front principal point position | Rear principal point position |
|---|---|---|---|---|---|
| 1 | 1 | −33.25 | 44.90 | 4.63 | −34.21 |
| 2 | 9 | 31.83 | 50.08 | 20.87 | −20.89 |
| 3 | 24 | −44.26 | 3.96 | 1.20 | −0.98 |
| 4 | 28 | 60.00 | 9.51 | 4.23 | −2.29 |

Single lens data

| Lens | First surface | Focal length |
|---|---|---|
| 1 | 1 | −42.03 |
| 2 | 3 | −74.36 |
| 3 | 5 | −38.64 |
| 4 | 6 | 31.76 |
| 5 | 9 | 93.85 |
| 6 | 12 | −35.44 |
| 7 | 13 | 60.29 |
| 8 | 15 | 51.03 |
| 9 | 18 | 25.62 |
| 10 | 19 | −28.70 |
| 11 | 21 | 25.17 |
| 12 | 22 | −35.30 |
| 13 | 24 | 79.95 |
| 14 | 26 | −29.07 |
| 15 | 28 | 60.00 |

[Numerical Data 2]

Unit: mm

Surface data

| Surface number | r | d | nd | vd | Effective diameter |
|---|---|---|---|---|---|
| 1* | 39.537 | 4.00 | 1.75500 | 52.3 | 76.00 |
| 2* | 15.645 | 20.13 | | | 51.78 |
| 3* | 5,631.265 | 2.28 | 1.89190 | 37.1 | 48.74 |
| 4* | 77.182 | 6.81 | | | 41.14 |
| 5 | −82.139 | 1.70 | 1.59522 | 67.7 | 40.93 |
| 6 | 33.924 | 9.25 | 1.91082 | 35.3 | 40.23 |
| 7 | −315.039 | (Variable) | | | 39.71 |
| 8 | ∞ | (Variable) | | | 29.27 |
| 9* | 189.118 | 1.50 | 1.74950 | 35.3 | 29.61 |
| 10 | 69.955 | 4.24 | 1.95375 | 32.3 | 30.14 |
| 11 | −315.456 | 9.01 | | | 30.44 |
| 12 (Stop) | ∞ | 1.11 | | | 32.02 |
| 13 | −1,168.888 | 1.50 | 1.72825 | 28.5 | 32.19 |
| 14 | 37.665 | 4.03 | 1.53775 | 74.7 | 32.78 |
| 15 | 85.261 | 0.20 | | | 33.26 |
| 16* | 28.152 | 9.69 | 1.43875 | 94.7 | 36.20 |
| 17 | −88.778 | 4.44 | | | 36.11 |
| 18 | ∞ | 0.00 | | | 34.51 |
| 19 | 31.804 | 5.69 | 2.00100 | 29.1 | 33.30 |
| 20 | 169.183 | 1.00 | 1.67300 | 38.1 | 32.06 |
| 21 | 21.389 | 1.82 | | | 27.64 |
| 22 | 27.410 | 11.11 | 1.49700 | 81.5 | 27.49 |
| 23 | −19.622 | 1.00 | 1.85478 | 24.8 | 26.00 |
| 24 | −38.583 | (Variable) | | | 25.76 |
| 25 | −49.924 | 2.81 | 1.92286 | 18.9 | 24.71 |
| 26 | −28.520 | 0.19 | | | 25.14 |
| 27* | −56.150 | 0.80 | 1.90270 | 31.0 | 24.71 |
| 28* | 50.534 | (Variable) | | | 25.55 |
| 29 | 218.768 | 8.31 | 1.49700 | 81.5 | 39.87 |
| 30 | −41.433 | (Variable) | | | 40.76 |
| Image plane | ∞ | | | | |

Aspherical surface data

First surface

K = 0.00000e+000  A4 = −1.83628e−005  A6 = −5.79426e−009
A8 = −1.53669e−011  A10 = −1.61420e−015  A12 = −4.71374e−018
A14 = 8.65386e−021  A16 = 4.99927e−024
A3 = −1.14883e−007  A5 = 4.84972e−007  A7 = 3.10781e−010
A9 = 3.59972e−013  A11 = −1.50740e−016  A13 = 2.54515e−019
A15 = −4.65116e−022

Second surface

K = −6.67032e−001  A4 = −2.88337e−005  A6 = −5.99585e−008
A8 = 3.28868e−010  A10 = −8.24585e−014  A12 = 3.40708e−017
A14 = 3.12849e−019  A16 = −1.10435e−021
A3 = 3.84504e−005  A5 = 1.30167e−006  A7 = −2.41024e−009
A9 = −1.23484e−011  A11 = 1.78200e−014  A13 = −3.68334e−017
A15 = 4.75578e−020

Third surface

K = 5.16241e+004  A4 = −1.15006e−005  A6 = −2.72234e−008
A8 = 1.24753e−010  A10 = 3.44213e−014  A12 = −6.31339e−016
A14 = 9.44781e−019  A16 = −4.58017e−022

Fourth surface

K = −6.71246e+000  A4 = −5.68084e−006  A6 = −1.03389e−008
A8 = 1.11021e−010  A10 = 2.60807e−013  A12 = −1.77102e−015
A14 = 3.77140e−018  A16 = −2.96590e−021

Ninth surface

K = −3.72144e+002  A4 = 5.48393e−006  A6 = −2.52868e−008
A8 = 7.05534e−011  A10 = −9.07691e−014  A12 = −3.39595e−018

Sixteenth surface

K = −3.61466e+000  A4 = 1.64254e−005  A6 = −2.32249e−008
A8 = 3.53938e−011  A10 = −2.99083e−014  A12 = 1.87562e−017

Twenty-seventh surface

K = 1.80325e+000  A4 = −2.73979e−005  A6 = 1.16938e−007
A8 = −5.86349e−010  A10 = 9.35341e−013  A12 = −2.79167e−016

Twenty-eighth surface

K = −3.32879e+001  A4 = 2.49156e−005  A6 = −3.63599e−008
A8 = 1.78305e−010  A10 = −1.37332e−012  A12 = 3.00061e−015

Various data
Zoom ratio 1.88

| | Wide angle | Intermediate | Telephoto |
|---|---|---|---|
| Focal length | 14.42 | 19.40 | 27.16 |
| F-number | 2.06 | 2.06 | 2.06 |
| Half angle of view (degrees) | 56.32 | 48.12 | 38.54 |
| Image height | 21.64 | 21.64 | 21.64 |
| Total lens length | 168.64 | 158.85 | 156.10 |
| BF | 16.32 | 16.32 | 16.32 |
| d7 | 20.75 | 14.17 | 0.20 |
| d8 | 11.30 | 0.53 | 0.20 |
| d24 | 1.00 | 2.08 | 3.46 |
| d28 | 6.66 | 13.13 | 23.30 |
| d30 | 16.32 | 16.32 | 16.32 |
| Entrance pupil position | 26.82 | 25.26 | 23.43 |
| Exit pupil position | −76.41 | −112.40 | −225.39 |
| Front principal point position | 39.00 | 41.74 | 47.54 |
| Rear principal point position | 1.90 | −3.08 | −10.84 |

Unit: mm

Lens unit data

| Unit | First surface | Focal length | Lens unit structure length | Front principal point position | Rear principal point position |
|---|---|---|---|---|---|
| 1 | 1 | −29.29 | 44.16 | 5.57 | −32.01 |
| 2 | 8 | ∞ | 0.00 | 0.00 | −0.00 |
| 3 | 9 | 32.98 | 56.34 | 26.24 | −23.04 |
| 4 | 25 | −49.94 | 3.80 | 0.80 | −1.24 |
| 5 | 29 | 70.84 | 8.31 | 4.72 | −0.89 |

Single lens data

| Lens | First surface | Focal length |
|---|---|---|
| 1 | 1 | −36.95 |
| 2 | 3 | −87.76 |
| 3 | 5 | −40.12 |
| 4 | 6 | 34.06 |
| 5 | 9 | −148.93 |
| 6 | 10 | 60.36 |
| 7 | 13 | −50.08 |
| 8 | 14 | 121.86 |
| 9 | 16 | 49.98 |
| 10 | 19 | 38.33 |
| 11 | 20 | −36.48 |
| 12 | 22 | 24.97 |
| 13 | 23 | −47.88 |
| 14 | 25 | 67.81 |
| 15 | 27 | −29.36 |
| 16 | 29 | 70.84 |

[Numerical Data 3]

Unit: mm

Surface data

| Surface number | r | d | nd | vd | Effective diameter |
|---|---|---|---|---|---|
| 1* | 34.639 | 2.70 | 1.58913 | 61.1 | 65.00 |
| 2* | 13.783 | 17.67 | | | 44.02 |
| 3* | −447.531 | 2.00 | 1.90270 | 31.0 | 41.64 |
| 4* | 72.436 | 5.69 | | | 35.86 |
| 5 | −73.400 | 2.63 | 1.60300 | 65.4 | 35.74 |
| 6 | 27.383 | 8.45 | 1.91082 | 35.3 | 34.42 |
| 7 | −428.225 | (Variable) | | | 33.72 |
| 8* | 36.941 | 3.00 | 1.85150 | 40.8 | 20.02 |
| 9 | 52.397 | (Variable) | | | 19.85 |
| 10 (Stop) | ∞ | 3.03 | | | 20.48 |
| 11 | 170.003 | 1.50 | 1.74950 | 35.3 | 21.19 |
| 12 | 25.088 | 4.01 | 1.53775 | 74.7 | 21.43 |
| 13 | 203.344 | 1.09 | | | 21.83 |
| 14* | 27.068 | 7.19 | 1.43875 | 94.7 | 23.14 |
| 15 | −78.231 | 0.20 | | | 23.04 |
| 16 | 33.314 | 4.50 | 2.00100 | 29.1 | 22.52 |
| 17 | −86.240 | 1.00 | 1.59551 | 39.2 | 21.71 |
| 18 | 20.864 | 2.07 | | | 19.16 |
| 19 | 29.030 | 7.73 | 1.49700 | 81.5 | 19.83 |
| 20 | −15.590 | 1.35 | 1.85896 | 22.7 | 19.93 |
| 21 | −36.456 | (Variable) | | | 21.08 |
| 22 | −35.563 | 2.73 | 1.95906 | 17.5 | 21.19 |
| 23 | −22.410 | 0.47 | | | 21.74 |
| 24* | −66.043 | 0.80 | 1.90270 | 31.0 | 21.08 |
| 25* | 28.662 | (Variable) | | | 21.84 |
| 26 | 92.094 | 9.79 | 1.49700 | 81.5 | 40.43 |
| 27 | −41.934 | (Variable) | | | 41.33 |
| Image plane | ∞ | | | | |

Unit: mm

Aspherical surface data

First surface

K = 0.00000e+000  A4 = −2.12683e−005  A6 = −4.09369e−008
A8 = −1.30860e−010  A10 = 1.15225e−013  A12 = 1.41929e−016
A14 = −1.55951e−019  A16 = −1.63756e−023
A3 = −1.18659e−004  A5 = 9.37186e−007  A7 = 2.88658e−009
A9 = 2.00732e−012  A11 = −7.69514e−015  A13 = 2.45879e−018
A15 = 2.63675e−021

Second surface

K = −7.27604e−001  A4 = −1.99811e−005  A6 = −7.90673e−008
A8 = −3.81958e−010  A10 = −4.72019e−012  A12 = −3.87844e−016
A14 = 1.59811e−017  A16 = 1.42890e−021
A3 = −1.16239e−004  A5 = 1.08712e−006  A7 = 2.04095e−009
A9 = 5.99838e−011  A11 = 1.88660e−013  A13 = −3.45283e−016
A15 = −2.91325e−019

Third surface

K = −3.27235e+003  A4 = −1.04740e−005  A6 = −7.55756e−009
A8 = 1.15188e−010  A10 = −8.90185e−014  A12 = −3.21263e−016
A14 = 4.77326e−019  A16 = −9.11297e−023

Fourth surface

K = 1.20943e+001  A4 = −5.91774e−006  A6 = −6.30846e−009
A8 = 1.75892e−010  A10 = −3.26066e−013  A12 = 2.28970e−016
A14 = 7.99940e−019  A16 = −2.38871e−021

Eighth surface

K = −2.10745e+000  A4 = 1.15089e−006  A6 = −8.59361e−009
A8 = 7.84776e−011  A10 = −6.16534e−013  A12 = 1.28772e−015

Fourteenth surface

K = 1.86037e+000  A4 = −1.57353e−005  A6 = −2.30348e−008
A8 = −7.74897e−011  A10 = −1.47092e−013  A12 = −1.63741e−015

Twenty-fourth surface

K = −5.25994e+000  A4 = −4.69971e−005  A6 = 7.24817e−008
A8 = −9.26476e−010  A10 = 4.20543e−012  A12 = −1.00325e−014

Twenty-fifth surface

K = −7.70969e−001  A4 = −4.49466e−006  A6 = 8.96090e−008
A8 = −7.13643e−010  A10 = 2.53499e−012  A12 = −3.29543e−015

Various data
Zoom ratio 1.91

| | Wide angle | Intermediate | Telephoto |
|---|---|---|---|
| Focal length | 14.20 | 20.21 | 27.16 |
| F-number | 2.80 | 2.80 | 2.80 |
| Half angle of view (degrees) | 56.72 | 46.95 | 38.54 |
| Image height | 21.64 | 21.64 | 21.64 |
| Total lens length | 142.27 | 132.17 | 131.64 |
| BF | 13.76 | 13.76 | 13.76 |
| d7 | 24.97 | 8.83 | 0.20 |
| d9 | 7.27 | 5.42 | 3.89 |
| d21 | 1.00 | 1.89 | 2.28 |
| d25 | 5.68 | 12.67 | 21.91 |
| d27 | 13.76 | 13.76 | 13.76 |
| Entrance pupil position | 25.01 | 22.73 | 20.85 |
| Exit pupil position | −60.79 | −98.17 | −206.56 |
| Front principal point position | 36.50 | 39.29 | 44.66 |
| Rear principal point position | −0.44 | −6.45 | −13.40 |

Lens unit data

| Unit | First surface | Focal length | Lens unit structure length | Front principal point position | Rear principal point position |
|---|---|---|---|---|---|
| 1 | 1 | −28.72 | 39.14 | 5.33 | −27.55 |
| 2 | 8 | 135.02 | 3.00 | −3.55 | −5.04 |
| 3 | 10 | 26.62 | 33.67 | 12.95 | −11.45 |

-continued

Unit: mm

| | | | | | |
|---|---|---|---|---|---|
| 4 | 22 | −34.47 | 4.00 | 1.24 | −0.96 |
| 5 | 26 | 59.42 | 9.79 | 4.61 | −2.10 |

Single lens data

| Lens | First surface | Focal length |
|---|---|---|
| 1 | 1 | −40.81 |
| 2 | 3 | −68.94 |
| 3 | 5 | −32.75 |
| 4 | 6 | 28.51 |
| 5 | 8 | 135.02 |
| 6 | 11 | −39.46 |
| 7 | 12 | 52.83 |
| 8 | 14 | 46.81 |
| 9 | 16 | 24.47 |
| 10 | 17 | −28.11 |
| 11 | 19 | 21.65 |
| 12 | 20 | −32.69 |
| 13 | 22 | 57.36 |
| 14 | 24 | −22.05 |
| 15 | 26 | 59.42 |

[Numerical Data 4]

Unit: mm

Surface data

| Surface number | r | d | nd | vd | Effective diameter |
|---|---|---|---|---|---|
| 1* | 38.622 | 2.70 | 1.61800 | 63.3 | 68.73 |
| 2* | 13.581 | 18.21 | | | 44.74 |
| 3* | −451.093 | 2.00 | 2.00100 | 29.1 | 44.08 |
| 4* | 77.748 | 6.87 | | | 39.51 |
| 5 | −57.857 | 1.70 | 1.53996 | 59.5 | 39.50 |
| 6 | 37.176 | 11.46 | 1.90067 | 38.5 | 42.11 |
| 7 | −77.232 | (Variable) | | | 41.94 |
| 8 | ∞ | (Variable) | | | 21.97 |
| 9* | 41.052 | 3.00 | 1.81600 | 46.6 | 22.52 |
| 10 | 80.302 | (Variable) | | | 22.26 |
| 11 (Stop) | ∞ | 4.32 | | | 22.31 |
| 12 | 396.989 | 1.50 | 1.76200 | 40.1 | 22.38 |
| 13 | 23.504 | 4.55 | 1.49700 | 81.5 | 22.32 |
| 14 | 404.994 | 0.20 | | | 22.65 |
| 15* | 27.511 | 5.75 | 1.49700 | 81.5 | 23.46 |
| 16 | −93.934 | 0.98 | | | 23.14 |
| 17 | 36.102 | 3.94 | 2.00069 | 25.5 | 21.99 |
| 18 | −149.333 | 1.00 | 1.65412 | 39.7 | 21.09 |
| 19 | 20.309 | 2.16 | | | 18.77 |
| 20 | 27.160 | 9.50 | 1.49700 | 81.5 | 18.23 |
| 21 | −16.306 | 1.00 | 1.89286 | 20.4 | 18.84 |
| 22 | −46.100 | (Variable) | | | 19.95 |
| 23 | −48.216 | 2.73 | 1.95906 | 17.5 | 20.58 |
| 24 | −24.403 | 0.22 | | | 21.13 |
| 25* | −75.469 | 0.80 | 1.95150 | 29.8 | 20.90 |
| 26* | 31.192 | (Variable) | | | 21.83 |
| 27 | 175.836 | 8.33 | 1.64000 | 60.1 | 40.92 |
| 28 | −45.547 | (Variable) | | | 41.82 |
| Image plane | ∞ | | | | |

Aspherical surface data

First surface

K = 0.00000e+000   A4 = −2.27715e−005   A6 = −4.31789e−008
A8 = −1.31075e−010   A10 = 1.14627e−013   A12 = 1.42638e−016
A14 = −1.55711e−019   A16 = −1.57914e−023
A3 = −1.27181e−004   A5 = 1.04776e−006   A7 = 2.90130e−009
A9 = 2.06942e−012   A11 = −7.73486e−015   A13 = 2.44229e−018
A15 = 2.63161e−021

-continued

Unit: mm

Second surface

K = −7.87879e−001   A4 = −1.94262e−005   A6 = −8.43351e−008
A8 = −2.36599e−010   A10 = −4.67436e−012   A12 = −1.04943e−015
A14 = 1.59155e−017   A16 = 1.12710e−021
A3 = −1.25923e−004   A5 = 1.30577e−006   A7 = 6.54945e−010
A9 = 5.39613e−011   A11 = 1.99143e−013   A13 = −3.27211e−016
A15 = −2.87372e−019

Third surface

K = −1.83421e+003   A4 = −1.60103e−005   A6 = −5.24376e−009
A8 = 1.35600e−010   A10 = −1.22945e−013   A12 = −3.08873e−016
A14 = 4.63162e−019   A16 = −7.58375e−023

Fourth surface

K = 1.26525e+001   A4 = −1.46494e−005   A6 = 5.14574e−009
A8 = 1.87595e−010   A10 = −4.64297e−013   A12 = 4.02323e−016
A14 = 4.45676e−019   A16 = −1.48768e−021

Ninth surface

K = 7.71276e−001   A4 = −4.89660e−006   A6 = −3.18179e−009
A8 = −3.62361e−011   A10 = 5.99457e−013   A12 = −2.51883e−015

Fifteenth surface

K = 2.47421e+000   A4 = −1.21020e−005   A6 = −3.30893e−008
A8 = −2.95248e−010   A10 = 1.34090e−012   A12 = −1.00697e−014

Twenty-fifth surface

K = −1.09865e+001   A4 = −4.43982e−005   A6 = 6.73788e−008
A8 = −9.03372e−010   A10 = 6.94219e−012   A12 = −3.25138e−014

Twenty-sixth surface

K = −3.65502e−001   A4 = −9.71542e−006   A6 = 5.25492e−008
A8 = −3.91028e−010   A10 = 2.21976e−012   A12 = −1.04990e−014

Various data
Zoom ratio 1.91

| | Wide angle | Intermediate | Telephoto |
|---|---|---|---|
| Focal length | 14.20 | 19.79 | 27.16 |
| F-number | 2.88 | 2.88 | 2.88 |
| Half angle of view (degrees) | 56.72 | 47.55 | 38.54 |
| Image height | 21.64 | 21.64 | 21.64 |
| Total lens length | 158.77 | 145.08 | 138.57 |
| BF | 13.47 | 13.47 | 13.47 |
| d7 | 32.72 | 17.39 | 1.00 |
| d8 | 10.22 | 2.81 | 1.00 |
| d10 | 1.28 | 1.98 | 4.07 |
| d22 | 2.00 | 1.13 | 1.20 |
| d26 | 6.16 | 15.38 | 24.82 |
| d28 | 13.47 | 13.47 | 13.47 |
| Entrance pupil position | 24.97 | 22.63 | 20.32 |
| Exit pupil position | −61.88 | −117.72 | −291.75 |
| Front principal point position | 36.50 | 39.43 | 45.07 |
| Rear principal point position | −0.73 | −6.32 | −13.69 |

Lens unit data

| Unit | First surface | Focal length | Lens unit structure length | Front principal point position | Rear principal point position |
|---|---|---|---|---|---|
| 1 | 1 | −42.50 | 42.94 | −4.76 | −53.00 |
| 2 | 8 | ∞ | 0.00 | 0.00 | −0.00 |
| 3 | 9 | 99.51 | 3.00 | −1.67 | −3.27 |
| 4 | 11 | 37.73 | 34.89 | 11.33 | −13.14 |
| 5 | 23 | −42.53 | 3.76 | 1.13 | −0.85 |
| 6 | 27 | 57.37 | 8.33 | 4.10 | −1.06 |

-continued

Unit: mm

Single lens data

| Lens | First surface | Focal length |
|---|---|---|
| 1 | 1 | −35.35 |
| 2 | 3 | −66.13 |
| 3 | 5 | −41.66 |
| 4 | 6 | 29.25 |
| 5 | 9 | 99.51 |
| 6 | 12 | −32.84 |
| 7 | 13 | 50.01 |
| 8 | 15 | 43.50 |
| 9 | 17 | 29.36 |
| 10 | 18 | −27.27 |
| 11 | 20 | 22.10 |
| 12 | 21 | −28.71 |
| 13 | 23 | 48.78 |
| 14 | 25 | −23.11 |
| 15 | 27 | 57.37 |

[Numerical Data 5]

Unit: mm

Surface data

| Surface number | r | d | nd | vd | Effective diameter |
|---|---|---|---|---|---|
| 1* | 33.308 | 2.70 | 1.58913 | 61.1 | 61.34 |
| 2* | 14.117 | 18.30 | | | 43.28 |
| 3* | −653.628 | 2.00 | 1.90270 | 31.0 | 37.98 |
| 4* | 76.469 | 3.94 | | | 34.17 |
| 5 | −94.454 | 2.48 | 1.53775 | 74.7 | 34.07 |
| 6 | 25.896 | 7.14 | 1.91082 | 35.3 | 32.41 |
| 7 | 233.468 | (Variable) | | | 31.57 |
| 8* | 44.812 | 3.04 | 1.69895 | 30.1 | 22.39 |
| 9 | 55.925 | (Variable) | | | 22.50 |
| 10 (Stop) | ∞ | 1.00 | | | 22.74 |
| 11 | 493.983 | 1.50 | 1.76200 | 40.1 | 23.15 |
| 12 | 32.647 | 4.14 | 1.49700 | 81.5 | 23.82 |
| 13 | 1,401.098 | 0.22 | | | 24.54 |
| 14* | 28.718 | 8.51 | 1.49700 | 81.5 | 26.47 |
| 15 | −66.746 | 1.00 | | | 26.49 |
| 16 | 34.979 | 4.27 | 2.00100 | 29.1 | 25.56 |
| 17 | −1,432.992 | 1.00 | 1.60342 | 38.0 | 24.69 |
| 18 | 21.799 | 4.32 | | | 22.17 |
| 19 | 28.595 | 7.62 | 1.49700 | 81.5 | 21.14 |
| 20 | −16.634 | 2.00 | 1.85478 | 24.8 | 20.61 |
| 21 | −35.064 | (Variable) | | | 21.92 |
| 22 | −37.729 | 2.76 | 1.95906 | 17.5 | 22.01 |
| 23 | −24.859 | 0.21 | | | 22.58 |
| 24* | −116.365 | 0.80 | 1.90270 | 31.0 | 21.99 |
| 25* | 30.368 | (Variable) | | | 22.41 |
| 26 | 142.048 | 9.54 | 1.62230 | 53.2 | 32.03 |
| 27 | −36.816 | (Variable) | | | 33.78 |
| 28 | 5,244.143 | 1.06 | 1.85150 | 40.8 | 34.80 |
| 29 | 75.503 | (Variable) | | | 35.15 |
| Image plane | ∞ | | | | |

Aspherical surface data

First surface

K = 0.00000e+000  A4 = −2.72817e−005  A6 = −3.89696e−008
A8 = −1.33039e−010  A10 = 1.16553e−013  A12 = 1.44704e−016
A14 = −1.52873e−019  A16 = −1.57124e−023
A3 = −7.34325e−005  A5 = 1.12667e−006  A7 = 2.76604e−009
A9 = 2.02563e−012  A11 = −7.70330e−015  A13 = 2.32103e−018
A15 = 2.57854e−021

Second surface

K = −7.08522e−001  A4 = −2.51137e−005  A6 = −6.79926e−008
A8 = −3.15882e−010  A10 = −4.68895e−012  A12 = −3.34879e−016
A14 = 1.67385e−017  A16 = 1.14074e−021

-continued

Unit: mm

A3 = −8.23960e−005  A5 = 1.29908e−006  A7 = 6.51103e−010
A9 = 6.08343e−011  A11 = 1.79624e−013  A13 = −3.5065 1e−016
A15 = −3.01174e−019

Third surface

K = −1.25547e+004  A4 = −1.48115e−005  A6 = −1.22310e−008
A8 = 1.35017e−010  A10 = −1.03768e−013  A12 = −3.69341e−016
A14 = 4.87948e−019  A16 = 9.13083e−023

Fourth surface

K = 1.38365e+001  A4 = −9.76296e−006  A6 = −2.78344e−008
A8 = 3.24084e−010  A10 = −9.26827e−013  A12 = 1.80972e−015
A14 = −1.85853e−018  A16 = −1.92565e−023

Eighth surface

K = 8.42840e+000  A4 = −1.68505e−005  A6 = −3.26827e−008
A8 = −2.22636e−010  A10 = 1.31971e−012  A12 = −8.53653e−015

Fourteenth surface

K = 2.07287e+000  A4 = −1.36021e−005  A6 = −4.39301e−009
A8 = −3.74948e−010  A10 = 1.96590e−012  A12 = −6.42631e−015

Twenty-fourth surface

K = 4.58017e+001  A4 = −3.40234e−005  A6 = 1.46907e−007
A8 = −1.51111e−009  A10 = 5.53915e−012  A12 = −4.81394e−015

Twenty-fifth surface

K = −1.69286e+000  A4 = −8.79800e−007  A6 = 1.25231e−007
A8 = −1.14382e−009  A10 = 3.07407e−012  A12 = 6.01883e−016

Various data
Zoom ratio 2.02

| | Wide angle | Intermediate | Telephoto |
|---|---|---|---|
| Focal length | 17.08 | 25.00 | 34.50 |
| F-number | 2.88 | 2.88 | 2.88 |
| Half angle of view (degrees) | 51.72 | 40.87 | 32.09 |
| Image height | 21.64 | 21.64 | 21.64 |
| Total lens length | 149.84 | 137.33 | 138.29 |
| BF | 14.04 | 16.77 | 25.28 |
| d7 | 26.75 | 8.43 | 0.26 |
| d9 | 6.51 | 4.18 | 1.80 |
| d21 | 1.00 | 3.08 | 3.90 |
| d25 | 9.00 | 12.41 | 17.02 |
| d27 | 3.00 | 2.93 | 0.50 |
| d29 | 14.04 | 16.77 | 25.28 |
| Entrance pupil position | 26.45 | 23.30 | 20.77 |
| Exit pupil position | −55.50 | −64.93 | −78.38 |
| Front principal point position | 39.34 | 40.65 | 43.79 |
| Rear principal point position | −3.04 | −8.23 | −9.22 |

Lens unit data

| Unit | First surface | Focal length | Lens unit structure length | Front principal point position | Rear principal point position |
|---|---|---|---|---|---|
| 1 | 1 | −30.00 | 36.55 | 6.64 | −22.68 |
| 2 | 8 | 290.00 | 3.04 | −6.49 | −8.09 |
| 3 | 10 | 27.92 | 35.59 | 13.50 | −13.49 |
| 4 | 22 | −41.51 | 3.76 | 0.74 | −1.25 |
| 5 | 26 | 47.96 | 9.54 | 4.77 | −1.24 |
| 6 | 28 | −89.97 | 1.06 | 0.58 | 0.01 |

Single lens data

| Lens | First surface | Focal length |
|---|---|---|
| 1 | 1 | −43.88 |
| 2 | 3 | −75.74 |
| 3 | 5 | −37.52 |
| 4 | 6 | 31.46 |
| 5 | 8 | 290.00 |
| 6 | 11 | −45.94 |

-continued

Unit: mm

| 7  | 12 | 67.19  |
|----|----|--------|
| 8  | 14 | 41.63  |
| 9  | 16 | 34.16  |
| 10 | 17 | −35.58 |
| 11 | 19 | 22.41  |
| 12 | 20 | −38.97 |
| 13 | 22 | 68.77  |
| 14 | 24 | −26.61 |
| 15 | 26 | 47.96  |
| 16 | 28 | −89.97 |

TABLE 1

|  |  | Numerical data 1 | Numerical data 2 | Numerical data 3 | Numerical data 4 | Numerical data 5 |
|---|---|---|---|---|---|---|
| fw |  | 14.42 | 14.42 | 14.20 | 14.20 | 17.08 |
| f1 |  | −33.25 | −29.29 | −28.72 | −42.50 | −30.00 |
| f2 |  | 31.83 | 32.98 | 135.02 | 99.51 | 290.00 |
| fn |  | −44.26 | −49.94 | −34.47 | −42.53 | −41.51 |
| fp |  | 60.00 | 70.84 | 59.42 | 57.37 | 47.96 |
| Lw |  | 164.32 | 168.64 | 142.27 | 158.77 | 149.84 |
| skw |  | 16.13 | 16.32 | 13.76 | 13.47 | 14.04 |
| Conditional Expression (1) | f1/fw | −2.31 | −2.03 | −2.02 | −2.99 | −1.76 |
| Conditional Expression (2) | f2/fw | 2.21 | 2.29 | 9.51 | 7.01 | 16.98 |
| Conditional Expression (3) | Lw/skw | 10.19 | 10.33 | 10.34 | 11.79 | 10.68 |
| Conditional Expression (4) | f1/skw | −2.06 | −1.79 | −2.09 | −3.16 | −2.14 |
| Conditional Expression (5) | f1/fn | 0.75 | 0.59 | 0.83 | 1.00 | 0.72 |
| Conditional Expression (6) | f1/fp | −0.55 | −0.41 | −0.48 | −0.74 | −0.63 |

While the disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-082015, filed Apr. 23, 2018, which is hereby incorporated by reference herein in its entirety.

What is claimed is:

1. A zoom lens consisting of, in order from an object side to an image side:
   a first lens unit having a negative refractive power;
   a second lens unit having a positive refractive power; and
   a rear lens group including a plurality of lens units,
   wherein an interval between each pair of adjacent lens units is changed during zooming,
   wherein the first lens unit is configured to move for zooming,
   wherein the rear lens group consists of, in order from an object side to an image side, a third lens unit having a positive refractive power, a fourth lens unit having a negative refractive power, and a fifth lens unit having a positive refractive power, and
   wherein conditional expressions:

$-3.2 < f1/fw < -1.66;$ $1.45 < f2/fw < 20.00;$ $10.19 < Lw/skw < 50.0;$ and $-10.0 < f1/skw < -1.2,$ are satisfied where f1 represents a focal length of the first lens unit, f2 represents a focal length of the second lens unit, fw represents a focal length of the zoom lens at the wide angle end, Lw represents a total length of the zoom lens at the wide angle end, and skw represents a back focus at the wide angle end.

2. The zoom lens according to claim 1, wherein the second lens unit is configured to move for zooming.

3. The zoom lens according to claim 1, wherein the first lens unit includes, in order from the object side to the image side, a first negative lens, a second negative lens, and a third negative lens.

4. The zoom lens according to claim 3, wherein the first negative lens and the second negative lens are not cemented to each other.

5. The zoom lens according to claim 3, wherein the first negative lens has an aspherical surface having a positive aspherical surface amount, and the second negative lens has an aspherical surface having a negative aspherical surface amount, wherein the aspherical surface amount represents a maximum value of an amount of deviation of an aspherical surface from a reference spherical surface in which a curvature radius of the reference spherical surface is a radius of a spherical surface determined by a surface apex and a beam effective diameter of the reference spherical surface, a sign of the aspherical surface amount is defined as positive when a direction of deviation of the aspherical surface from the reference spherical surface is such a direction as to increase the thickness of a medium from the reference spherical surface and the sign of the aspherical surface amount is defined as negative when the direction of deviation is such a direction as to reduce the thickness of the medium from the reference spherical surface.

6. The zoom lens according to claim 1, wherein a conditional expression:

$0.3 < f1/fn < 5.0,$ is satisfied where fn represents a focal length of a lens unit having a negative refractive power, which is arranged closest to the object side among lens units having a negative refractive power included in the rear lens group.

7. The zoom lens according to claim 1,
   wherein the rear lens group includes at least one lens unit having a positive refractive power, and
   wherein a conditional expression:

$-2.0 < f1/fp < -0.2,$ is satisfied where fp represents a focal length of a lens unit having a positive refractive power, which is arranged closest to the image side among lens units having a positive refractive power included in the rear lens group.

8. An image pickup apparatus comprising:
a zoom lens; and
an image pickup element configured to receive an image formed by the zoom lens,
wherein the zoom lens consists of, in order from an object side to an image side:
a first lens unit having a negative refractive power;
a second lens unit having a positive refractive power; and
a rear lens group including a plurality of lens units,
wherein an interval between each pair of adjacent lens units is changed during zooming,
wherein the first lens unit is configured to move for zooming,
wherein the rear lens group consists of, in order from an object side to an image side, a third lens unit having a positive refractive power, a fourth lens unit having a negative refractive power, and a fifth lens unit having a positive refractive power, and
wherein conditional expressions:

$-3.2 < f1/fw < -1.66;$ $1.45 < f2/fw < 20.00;$ $10.19 < Lw/skw < 50.0;$ and $-10.0 < f1/skw < -1.2,$ are satisfied where f1 represents a focal length of the first lens unit, f2 represents a focal length of the second lens unit, fw represents a focal length of the zoom lens at the wide angle end, Lw represents a total length of the zoom lens at the wide angle end, and skw represents a back focus at the wide angle end.

9. A zoom lens comprising, in order from an object side to an image side:
a first lens unit having a negative refractive power;
a second lens unit having a positive refractive power; and
a rear lens group including a plurality of lens units,
wherein an interval between each pair of adjacent lens units is changed during zooming,
wherein the first lens unit is configured to move for zooming,
wherein the first lens unit includes, in order from the object side to the image side, a first negative lens, a second negative lens, and a third negative lens,
wherein the rear lens group includes at least one lens unit having a negative refractive power, and
wherein conditional expressions:

$-3.2 < f1/fw < -1.66;$ $1.45 < f2/fw < 20.00;$ $8.0 < Lw/skw < 50.0;$ and $-10.0 < f1/skw < -1.2,$ are satisfied where f1 represents a focal length of the first lens unit, f2 represents a focal length of the second lens unit, fw represents a focal length of the zoom lens at the wide angle end, Lw represents a total length of the zoom lens at the wide angle end, and skw represents a back focus at the wide angle end.

10. The zoom lens according to claim 9, wherein the first negative lens and the second negative lens are not cemented to each other.

11. The zoom lens according to claim 9, wherein the first negative lens has an aspherical surface having a positive aspherical surface amount, and the second negative lens has an aspherical surface having a negative aspherical surface amount, wherein the aspherical surface amount represents a maximum value of an amount of deviation of an aspherical surface from a reference spherical surface in which a curvature radius of the reference spherical surface is a radius of a spherical surface determined by a surface apex and a beam effective diameter of the reference spherical surface, a sign of the aspherical surface amount is defined as positive when a direction of deviation of the aspherical surface from the reference spherical surface is such a direction as to increase the thickness of a medium from the reference spherical surface and the sign of the aspherical surface amount is defined as negative when the direction of deviation is such a direction as to reduce the thickness of the medium from the reference spherical surface.

12. A zoom lens consisting of, in order from an object side to an image side:
a first lens unit having a negative refractive power;
a second lens unit having a positive refractive power; and
a rear lens group including a plurality of lens units,
wherein an interval between each pair of adjacent lens units is changed during zooming,
wherein the first lens unit is configured to move for zooming,
wherein the rear lens group consists of, in order from an object side to an image side, a third lens unit having a positive refractive power, a fourth lens unit having a negative refractive power, a fifth lens unit having a positive refractive power, and a sixth lens unit having a negative refractive power, and
wherein conditional expressions:

$-3.2 < f1/fw < -1.66;$ $1.45 < f2/fw < 20.00;$ $10.19 < Lw/skw < 50.0;$ and $-10.0 < f1/skw < -1.2,$ are satisfied where f1 represents a focal length of the first lens unit, f2 represents a focal length of the second lens unit, fw represents a focal length of the zoom lens at the wide angle end, Lw represents a total length of the zoom lens at the wide angle end, and skw represents a back focus at the wide angle end.

* * * * *